(12) United States Patent
Freydel et al.

(10) Patent No.: US 7,047,440 B1
(45) Date of Patent: May 16, 2006

(54) DUAL/TRIPLE REDUNDANT COMPUTER SYSTEM

(76) Inventors: Lev R. Freydel, 1544 Berendo Ave., Akron, OH (US) 44313; Nathan Ida, 664 San Moritz Dr., Akron, OH (US) 44333

( * ) Notice: Subject to any disclaimer, the term of this patent is extended or adjusted under 35 U.S.C. 154(b) by 75 days.

(21) Appl. No.: 10/899,667

(22) Filed: Jul. 27, 2004

(51) Int. Cl.
*G06F 11/00* (2006.01)

(52) U.S. Cl. ............................ 714/11; 714/10; 714/12

(58) Field of Classification Search ............ 714/10–13
See application file for complete search history.

(56) References Cited

U.S. PATENT DOCUMENTS

| | | | |
|---|---|---|---|
| 5,339,404 A * | 8/1994 | Vandling, III ................ | 714/1 |
| 5,452,441 A * | 9/1995 | Esposito et al. .............. | 714/13 |
| 5,491,787 A | 2/1996 | Hashemi | |
| 5,777,874 A | 7/1998 | Flood et al. | |
| 6,247,143 B1 * | 6/2001 | Williams ..................... | 714/11 |
| 6,411,857 B1 | 6/2002 | Flood | |
| 6,449,732 B1 | 9/2002 | Rasmussen et al. | |
| 6,550,018 B1 | 4/2003 | Abonamah et al. | |
| 6,732,300 B1 | 5/2004 | Freydel | |
| 6,754,846 B1 * | 6/2004 | Rasmussen et al. .......... | 714/11 |
| 6,760,634 B1 | 7/2004 | Cook et al. | |
| 2005/0246581 A1 * | 11/2005 | Jardine et al. ................ | 714/12 |

* cited by examiner

*Primary Examiner*—Robert Beausoleil
*Assistant Examiner*—Yolanda L Wilson
(74) *Attorney, Agent, or Firm*—Renner Kenner Greive Bobak Taylor & Weber

(57) ABSTRACT

A dual/triple redundant computer system having in one of the preferred embodiments triple redundant I/O modules and dual redundant central processor modules (CPM) that operate in parallel executing the same application program. Each input module includes three input circuits operating in parallel. The first CPM receives input data from first and third input circuits and transmits input data of the first input circuit to the second CPM. The second CPM receives input data from second and third input circuits and transmits input data of the second input circuit to the first CPM. Each CPM then performs a two-out-of-two vote among input data produced by first, second, and third input circuits and utilizes an outvoted data as input to the application program to provide output data by execution of the application program.

Each output module includes three microcontrollers operating in parallel. First and second microcontroller receives output data respectively from first and second CPM, while a third microcontroller receives at the same time output data from both first and second CPM. First microcontroller transmits output data to a first and a second output circuit. Second microcontroller transmits output data to second and third output circuit. The third microcontroller performs a selected logic operation among output data produced by first and second CPM and then transmits a result of this operation to third and first output circuits. Each output circuit generates a logical product of output data received from two associated microcontrollers. Outputs of first, second, and third output circuit are connected to each other for providing a two-out-of-three voting among output data produced by first, second, and third microcontroller, and for allowing the system to generate a system output as a result of a two-out-of-two voting of output data generated by first and second central processor modules.

11 Claims, 8 Drawing Sheets

DUAL/TRIPLE REDUNDANT COMPUTER SYSTEM

TECHNICAL FIELD

The present invention relates generally to computer systems devoted to safety-critical and critical-control applications. More particularly, the present invention relates to multiple redundant systems that combine dual and triple redundant approaches to provide high level of system fault tolerance and reliability in a cost-effective way.

BACKGROUND OF THE INVENTION

The evolution of computers has allowed the proliferation of programmable control systems for handling critical tasks, such as industrial control of oil, gas, nuclear, and chemical processes, patient monitoring, aircraft flight control, and military equipment among others. Within these systems, emergency shutdown systems are used in safety-critical applications for monitoring processes and removing the process to a safe state when selected process variables fall outside of a safe range.

Computer systems devoted to industrial safe and critical control applications must have extremely high degrees of safety and reliability since faults in computer systems can cause vast economic loses and endanger human beings. A system failure that occurs as a result of a system component fault can be either safe or dangerous. A safe failure occurs when a system has failed into a safe state, or in other words, where the system does not disrupt the operation of other systems or compromises the safety of personnel associated with the system. The safe failure occurs, for example, when an emergency shutdown system (ESD) fails in such a way that it causes a shutdown not associated with the controlled process. A dangerous failure is a failure that prevents the system from responding to hazardous situations, allowing hazards to develop. For instance, a dangerous failure occurs when the ESD cannot perform a required shutdown.

Redundant configurations of computing systems have been used in research and designs to provide system fault tolerance, which is concerned with the continuation of correct operation of a system despite occurrence of internal fault recovery. Computer systems for use in safety-critical and critical-control applications are usually developed through either Triple Redundant (TMR) or Dual Redundant (2oo2D) architecture.

The TMR system is the most common form of voting based systems. The TMR that is disclosed in the U.S. Pat. No. 6,449,732 includes three identical control channels each of which independently executes an application program in parallel with the other channels. Each channel houses a main processor module (MPM) that communicates with respective legs located in I/O modules. Each input and output module of the TMR system comprises three identical legs in a redundant configuration. This system performs a majority voting for all digital inputs and outputs from a field for masking possible input/output faults. By using three identical channels in combination with voting mechanisms, any single fault is masked by the 2-of-3 voting, so any single fault does not lead to the system failure. The TMR system is also able to remain operational although in the presence of up two faulty main processor modules since one healthy MPM can manage system functions.

In many cases, however, two concurrent faults lead to a system failure. The primary difficulty with the TMR system is the voter. If the TMR is used as an Emergency Shutdown system, it usually deploys digital output modules each of which has outputs that shall be in ON condition per controlled point under normal operation and in OFF condition for a shutdown. The digital output module uses a quadruplicated output voter circuitry per point that provides the two-out-of-three voting among outputs of three legs. The quadruplicated output voter circuitry consists of two parallel pair path each includes two switches in serial. In the event that two switches located in parallel branches of output voter circuitry concurrently fail, the TMR will make a false shutdown since it not associated with the controlled process. In the event that two switches in series concurrently fail remaining in ON condition permanently, a dangerous failure occurs since the system becomes unable to make a shutdown if it is required. In such event the system becomes inoperative and it shall to use some external means for making the shutdown to avoid the dangerous failure. In both of these scenarios the TMR system becomes inoperative as a result of two concurrent faults occurring. The TMR system also may fail when two legs in the output module concurrently fails.

A less expansive way for achieving fault tolerance and increase reliability is deploying the Dual Redundant architecture of the system. The Dual Redundant system (DRS) such as 2oo2D system described in the book Goble, W. M. "Control Systems Safety Evaluation & Reliability", ISA (1998) pp. 364–375. The DRS includes two programmable controllers operating in parallel. Each controller has a central processor module and a set of the associated input/output modules. Each controller also incorporate an independent diagnostic module that opens a special output switch for de-energizing controller outputs in the event that the controller fails. The DRS remains operational in the presence of one faulty controller and it makes a shutdown in the event that both controllers fail concurrently. In general, the system provides no single point of failure in regard to persistent faults that can occur in system components. As well as the TMR, the 2oo2D system only guaranties a single fault tolerance since it may often become inoperative in the presence of two faulty components.

The DRS controllers are relatively simple and considerably less expansive that TMR controllers. However, fault tolerance and reliability of the 2oo2D system depends in great part on the fault coverage, which is defined as the probability that a failure will be detected/recovered if it occurs. In contrast to the voting based system, the 2oo2D system has no property of fault masking. Hence, in the event that two controllers produce different outputs the system shall make a shutdown in a case that a fault in one controller cannot be detected and the system has no means to define which controller produces an error output.

The enhanced TMR system, such as the Hybrid Triple Redundant (HTR) computer systems disclosed in the U.S. Pat. No. 6,510,018 and U.S. Pat. No. 6,670,038 combine two-out-of-three voting with diagnostic and fault recovery means configured such that the system remains operational in the presence of multiple faulty components. In general, the system is guaranteed to operate properly in the presence of up to two hard faults and may continue to operate properly with three and more faults that have persisted in any system components. As well as the conventional TMR, the HTR system includes three identical control channels, each of which independently executes an application program in parallel with the other channels.

The HTR is different with the TMR that the HTR system As well as the TMR, the HTR system includes three identical control channels, each of which independently executes an application program in parallel with the other channels. The HTR is different with the TMR that the HTR system employs an innovative scheme to the output module and of the output voter that remain operational in the presence of any two faulty components and it may operate properly in the presence of more than two faults.

The HTR system provides fault recovery means to disable outputs of a faulty leg of the output module and pass control of the system outputs to neighbor legs for providing 3-2-1-0 mode of operation. With three channels running, a two-out-of-three (2-of-3) vote for a shutdown is used. In the event that one channel fails, the voting becomes two-out-of-two (2-of-2). The failure of a second channel causes the HTR to revert to a one-out-of-one (1-of-1) mode. The failure of a third channel causes the HTR to go to a fail-safe state, i.e. to make a shutdown. These means also ensure that the output voter of each controlled point remains operational in the presence of any two faulty switches and allows the output voter to operate properly in the presence of certain three and more faults. For example, the output module is able to revert from 2-of-3 vote to 2-of-2 vote if any two switches in series concurrently fail remaining ON condition permanently.

The leading TMR systems are also able to operate in the 3-2-1-0 mode but they cannot extend this capability completely to their input and output modules since any output module may fail in the event that certain of its two components concurrently fail. In such event that two output switches in the voter circuitry concurrently fail in such a way that system output(s) is permanently ON, the TMR system shall initiate a shutdown to avoid a dangerous system failure.

The HTR architecture provides a major improvement of system fault tolerance, safety, and reliability in the comparison to the control systems based on TMR or Dual Redundant (DRS) architecture that only guaranty a single fault tolerance. It allows the user to deploy the HTR system for very responsible applications where two faults and even more must be tolerated hence the TMR and the DRS system cannot be accepted. The HTR controller can be implemented with comparable cost to the TMR controller. Unfortunately both HTR and TMR controllers are considerable more expansive that the Dual Redundant controller. It is especially true in regard to industrial control applications that need the user to write pretty complex application program required a vast capacity of memory in central processor module. For such type of applications the TMR controller shall provide at least 16 Mb-memory for user-written program and up to 8 Mb for an operating system that controls the off-line/start-up, I/O data polling, I/O modules communications, on-line continuous diagnostics, and external communications. To implement functions listed above, the central processor module (CPM) usually incorporates basis components such as a powerful main processor, an I/O processor, a communication processor and a high capacity of DRAM and Flash memory. Because of that the CPM becomes very expensive, three central processor modules bring significant contribution to the total system cost.

Another difficulty with TMR and HTR is the synchronization for ensuring that each central processor operates in synchrony with the other two central processors, as a member of a triad. Each of the processors communicates with its neighbors for synchronization at least one per application execution cycle, and each processor reads the input, output and diagnostic status of its neighbors. The processors then vote input data and utilize outvoted data as input to the application program. The synchronization and voting procedure are time consuming hence they have a significant impact on system speed. Synchronization problems increase dramatically when the system operates with a lot amount of inputs and outputs. In this case, means that provide synchronization and voting can be pretty complicated and expensive for avoiding possible synchronization errors and handling high system throughput.

According to statistics data, based on industry studies (Ref. 1), about 95% of control system failures are caused by malfunctions occurred in I/O subsystems and field devices such as sensors and final control elements. Only 5% of control system failures occur as a result of failures in central processor modules. Because I/O modules and field devices are most vulnerable components of control systems, the HTR configuration of I/O modules is a good solution since it provides a highest possible level of fault tolerance in the comparison with existing I/O configurations. In other hands, central processor modules are fewer subjects to failures than I/O modules but they bring significant contribution to the total system cost. Therefore, the use of dual redundant configuration of central processor module would be useful for making the system significantly less expansive than it is with triple redundant processor modules.

The Dual/Triple Redundant (DTR) system comprises dual redundant central processor modules and triple redundant configuration of I/O modules. The DTR system is provided either for parallel redundant or in hot standby version. The DTR system has no single point of failure with respect to the CPM and it remains operational in the presence of any two or even more failures in any of the I/O modules. Since the DTR system is significantly less expensive than the HTR for the same application, the user can get economical benefit without significant sacrifice of system reliability.

The DTR system that is assigned for operating with a large amount of I/O modules comprises a plurality of I/O subsystems working simultaneously for input data collecting and two-out-of-three voting to relieve central processors module from these procedures. Synchronization problems as well as the time required to collect the input data and perform the two-out-of-three voting is considerably decreased since each I/O subsystem operates with relatively small number of I/O points. Besides of that, input data collecting and two-out-of-three voting overlapping the application program execution. It allows significantly increase the system throughput.

SUMMARY OF THE INVENTION

An object of the present invention, therefore, is an improved Dual/Triple Redundant Computer System that combines triple redundant I/O modules with dual redundant central processor modules for developing the system that is considerably less expansive that the TMR and the HTR system without significant sacrifice of system reliability.

It is another object of the present invention to develop the Dual/Triple Redundant Computer System that has no single point of failure with respect to central processor modules and remains operational in the presence up to two faults that concurrently occurred in any I/O modules.

It is another object of the present invention to develop the Dual/Triple Redundant Computer System that provides a two-out-of-two voting of output data produced by central processor modules.

It is another object of the present invention to develop the Dual/Triple Redundant Computer System that is modified from the two-out-of-two voting to the one-out-of-one voting in the presence of one faulty central processor modules and it fails safely in the event that both central processor modules concurrently fail.

It is another object of the present invention to develop the Dual/Triple Redundant Computer System that provides a two-out-of-three voting for digital input data produced by each input module and for digital output data that each output module operates.

It is another object of the present invention to develop the Dual/Triple Redundant Computer System that remains operational in the presence of any two faulty components in any input modules or in any output modules.

It is another object of the present invention to develop the Dual/Triple Redundant Computer System that is able to fail safely in the presence of non recoverable three faults in any input modules and any output modules.

It is another object of the present invention to develop the Dual/Triple Redundant Computer System in both parallel and hot standby operation mode.

It is another object of the present invention to develop the Dual/Triple Redundant Computer System that comprises a plurality of I/O subsystems that simultaneously operate for collecting and voting I/O data, and transferring correct input data to each central processor module, thereby improving system throughput.

In view of these objects, the present invention generally provides a Dual/Triple Redundant Computer System comprising a plurality of I/O modules and two central processor modules (CPM) in a Dual Redundant configuration. Each input module contains a first, a second, and a third identical input circuits operating in parallel. A first and a second CPM communicate with input circuits in a way that the first central processor module connected to the first input circuit and to the third input circuit for receiving input data from said input circuits, for implementing a selected logic operation with input data received from said input circuits and for using a result of said logic operation as input to a application program to provide output data by execution of said application program; the second central processor module connected to the second input circuit and to the third input circuit for receiving input data from said input circuits, for implementing a selected logic operation with input data received from said input circuits and for using a result of said logic operation as input to said application program to provide output data by execution of said application program;

The first CPM receives input data from first and third input circuits and then transmits input data of the first input circuit to the second CPM via a redundant communication bus. The second CPM also receives input data but from second and third input circuits and then transmits input data of the second input circuit to the first CPM via a redundant communication bus. Each CPM, therefore, collects input data produced by first, second, and third input circuits. Each CPM performs then two-out-of-three voting among input data received from first, second, and third input circuits. Each CPM employs the voted input data as input for the application program and sends output data generated by this program to the output module. These techniques allow the system to mask possible input faults that may occur in each input circuit.

The system in present invention also provides two-out-of-three voting among output data. The output module comprises a first, a second, and a third microcontroller. The first CPM connected to the first microcontroller and to the third microcontroller for transferring its output data to each of said microcontrollers. The second central processor module connected to the second microcontroller and to the third microcontroller for transferring its output data to each of said microcontrollers. The first and the second microcontroller then transfer output data that they respectively received from the first CPM and the second CPM to the associated outputs. The third microcontroller receiving output data from both first CPM and second CPM performs a logical sum of these data and then the third microcontroller transfers the logic sum on its output.

The output module further includes a first, a second, and a third output circuit. The first output circuit is connected to first and third microcontrollers for respectively receiving output data produced by the first CPM and the logic sum of output data produced by first CPM and second CPM. The first output circuit generates a logical product of output data produced by the first CPM and said logical sum and transfers this logical product on an output of this output circuit. The second output circuit is connected second and first microcontrollers for respectively receiving output data produced by the second CPM and by the first CPM. The second output circuit generates a logical product of output data produced by first and second CPM and transfers this logical product on an output of this output circuit. The third output circuit is connected to third and second microcontrollers for respectively receiving the logic sum of output data produced by first CPM and second CPM and output data produced by the second CPM. The third output circuit generates a logical product of said logical sum and output data produced by the second CPM and transfers this logical product on an output of this output circuit.

The outputs of said first, second, and third output circuits are connected to each other to provide a logical sum of said logical products of these output circuits. It allows the system to provide a system output per controlled point as a result of perform a two-out-of-three vote among output data A, B, and C produced by the first, second, and third microcontrollers respectively since the system output is defined as:

$$\text{OUTPUT} = A\hat{\ }C + B\hat{\ }A + C\hat{\ }B$$

A and B data respectively presents output data produced by first CPM and second CPM, while C data presents a logical sum C=A+B. A, B, and C data are equal under normal system operation. But they can be wrong due some malfunction that may appear in some system components. The two-out-of-three vote allow the system to mask possible faults that may occur in each control and output circuit.

After substitution C=A+B into OUTPUT equation, the system output is transformed to:

$$\text{OUTPUT} = A + B$$

With respect to CMPs output data, therefore, the system in normal operation performs two-out-of-two vote of output data generated by first and second CPM.

The first and the second microcontroller in the output module further has means for detecting the occurrence of a fault within the associated central processor module, and for activating an alarm signal in the event that said central processor module fails. The third microcontroller has means for detecting the occurrence of a fault within the first and the second central processor module and for receiving output data only from one of said central processor modules that has not failed. The third microcontroller activates an alarm signal in the event that both first and second central processor module concurrently fail.

The system output is generating as the result of the logical sum of outputs produced by the first and the second CPM to provide the two-out-of-two vote among data produced by two central processor modules if said alarm signal in each of said microcontrollers is not activated. In the event that one CPM fails, the associated alarm is activated and the system output is generating for only using output data received from the healthy CPM. In the event that both CPM concurrently fail the system output is passed to a safe OFF condition.

The output module also has means for detecting the occurrence of a fault within the microcontroller and for respectively activating a first, a second, and a third alarm signal in the event that first, or the second, or the third microcontroller fails. These means provides each output circuit for generating its output as a logical product of output data received from the associated and the neighbor microcontroller if no one of said alarm signals is not activated. The output circuit generates its output by only using output data received from the associated microcontroller if at least one out of two alarm signals associated with neighbor microcontrollers is activated. It disables its output if the associated microcontroller fails and the associated alarm signal is activated. The output module, therefore, is capable to reconfigure from two-out-of-three configuration to a two-out-of-two configuration in the event that that one microcontroller fails. In the event that that two microcontroller concurrently fail, the output module reconfigures to one-out-of-one configuration and it goes to the predetermined safe output condition in the event that each microcontroller fail. The system, therefore, remains operational in the presence of up to two faulty microcontrollers and it makes a shutdown only in the event that all microcontrollers fail.

Each microcontroller further in turn has means for reading status of the associated output circuit and disabling the output of said output circuit if a fault of said output circuit is discovered. These means provides the output module remain operational in the presence of two faulty output circuits. In general, the system remains operational in the face of any two concurrent faults that may occur in the output module. In regard to central processor modules the system has no single point of failure.

DESCRIPTION OF THE PREFERRED EMBODIMENTS

1. The Concept of the Dual/Triple Redundant Computer System (DTRC System)

Figure 1:
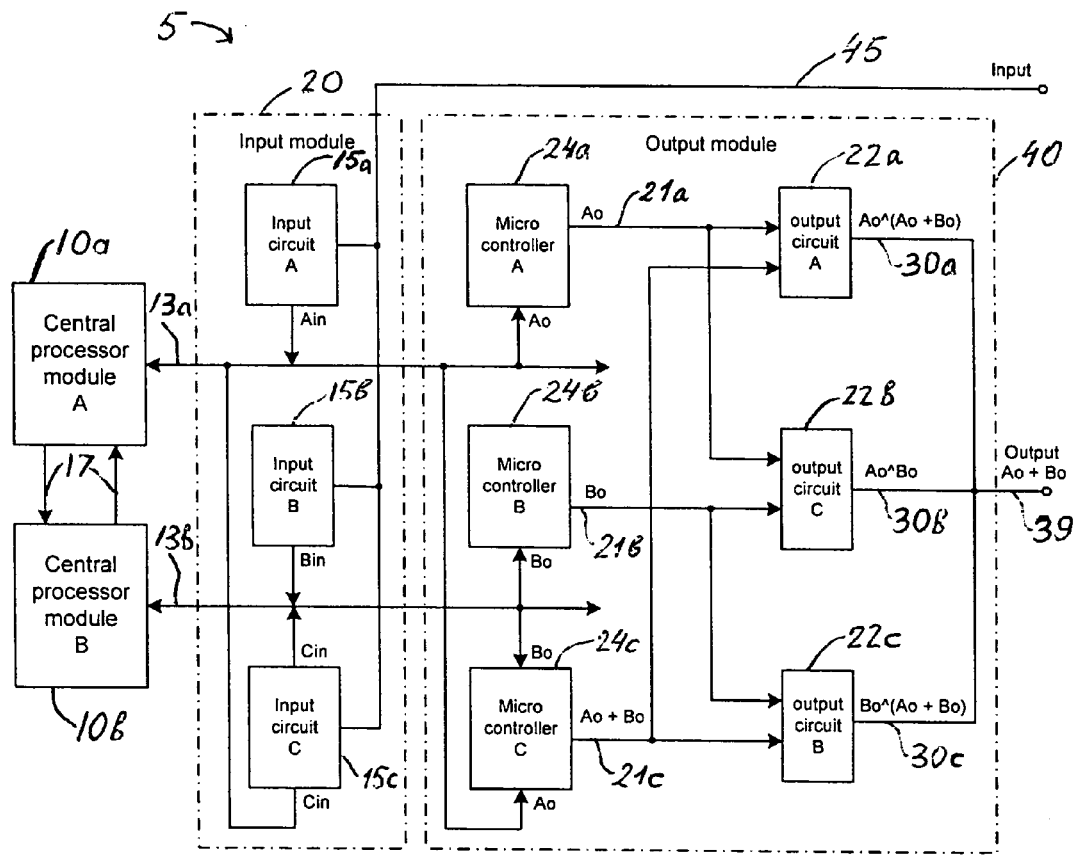
FIG. 1 is a block diagram of a dual/triple redundant system according to the concept of the present invention.

The concept of the presented DTRC system is shown in FIG. 1. The system 5 includes two identical central processor modules 10a and 10b, input module 20, and output module 40. Additional I/O modules can also be included into the system 5 to expand the system 5. The input module 20 comprises three input circuits 15 operating in parallel. Input circuits 15a and 15b read the same field data on input 45 per process point and transmit these data to central processor modules 10a and 10b over I/O buses 13A, 13B respectively.

The input circuit 15c reads the same field data as input circuits 15a and 15b but the input module 15c transmits these data to both central processor modules 10a and 10b over I/O buses 13A, 13B respectively. The central processor modules 10a and 10b operate in parallel. The central processor module 10a receives input data from input circuits 15a and 15c over I/O bus 13a, while the central processor module 10b receives input data from input circuits 15b and 15c over I/O bus 13b. The central processor modules 10a and 10b communicate with each other over a redundant communication bus 17.

The output module 40 comprises three microcontrollers 24 operating in parallel. Microcontrollers 24a and 24b are connected respectively to central processor modules 10a and 10b over I/O buses 13A and 13B for receiving output data produced by the associated central processor modules 10. The microcontroller 24c is connected to central processor modules 10a and 10b over I/O buses 13A and 13B respectively for receiving output data produced by each of the processor modules 10. Each microcontroller 24 then transmits the associated output data to an associated output circuit 22 and to the neighbor output circuit 22. In this way, the microcontroller 24a transmits output data to output circuits 22a and 22b over line 21a, the microcontroller 24b transmits output data to output circuits 22b and 22c over line 21b, and the microcontroller 24c transmits output data to output circuits 22c and 22a over line 21c. Outputs 30a, 30b, and 30c of the associated output circuits 22 are connected to each other to provide a system output 39 for each process point. The system 5 can operate with multiple I/O process points via associated inputs 45 and outputs 39. Inputs 45 and outputs 39 are connected to the associated field devices such as various sensors and actuators (not shown in FIG. 1.) As will become clear as the description proceeds, the output module 40 also includes a fault detection and fault recovery means (not shown in FIG. 1.)

Figure 2:
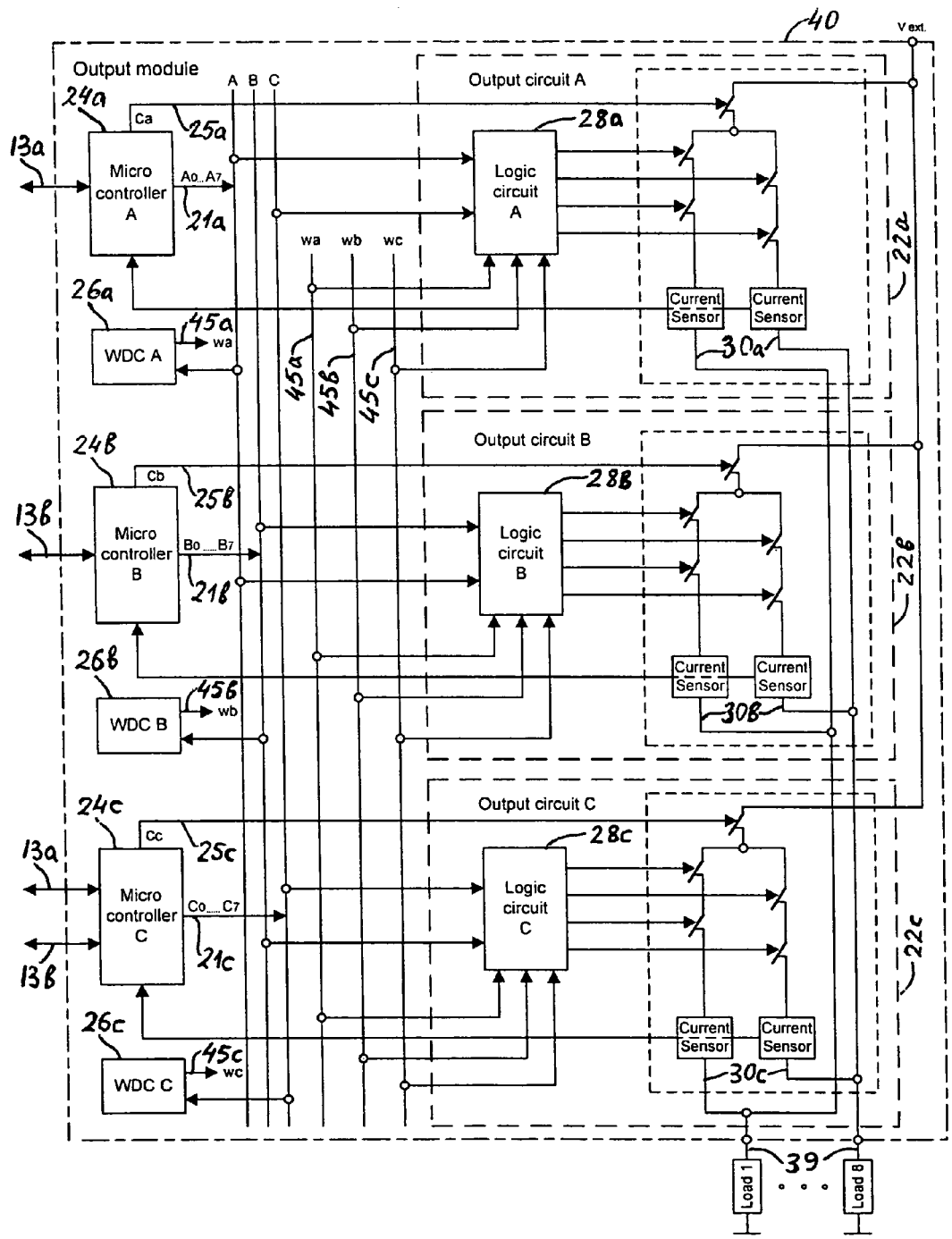
FIG. 2 is a block diagram showing the components of an output module according to the present invention.

FIG. 2 depicts a more detailed block diagram of the output module 40. The output module 40 configuration is the same as the configuration of the output module discovered in U.S. Pat. No. 6,732,300, incorporated herein by reference, related to the Hybrid Triple Redundant Computer (HTRC) system. In FIG. 2 we used for each component of the output module 40 the same position number as the corresponding component of the output module shown in FIGS. 2 and 3 of the U.S. Pat. No. 6,732,300. This was done in order to show that the output module 40 of the present invention employs the same components that the output module of the U.S. Pat. No. 6,732,300 employs. The output module 40 of the present invention comprises microcontrollers 24 and associated output circuits 22, each output circuit 22 includes a logic circuit 28 and a voter network 32. The output module 40 in the present invention also includes three identical watchdog controllers 26 that implement the same functions as watchdog controllers 26 in output module 40 discovered in U.S. Pat. No. 6,732,300.

The only difference between output modules 40 in the present invention and the output module in the U.S. Pat. No. 6,732,300 is in the functions that the microcontroller 24c implements and with which central processor modules 10 the microcontroller 24c communicates. The microcontroller 24c of the present invention is connected to both central processor modules 10a and 10b, while the associated microcontroller 24c in the output module 40 in the U.S. Pat. No. 6,732,300 is only connected to one central processor module 10c. The microcontroller 24c receives output data from both CPM 10a and CPM 10b and produces a selected logical operation with these output data as it will become clear as description proceeds. In contrast, the microcontroller 24c in the U.S. Pat. No. 6,732,300 only uses output data generated by the associated central processor module 10c.

The watchdog controller 26 is devoted to monitoring operation of the associated microcontroller 24 and to producing an alarm signal 45 in the event that the associated microcontroller 24 fails. The watchdog controller 26 is automatically set for a predetermined time interval. If the microcontroller 24 does not reset the associated watchdog controller 26 within said predetermined time interval due to software or hardware malfunction the watchdog controller 26 cannot be cleared, and it overflows. In that case, the watchdog controller 26 activates the associated alarm signal 45 that disables all outputs of the associated voter network 32. It prevents the system output 39 from the impact of possible incorrect output data in the event that the microcontroller 24 fails. The activation of the alarm signal 45 also provides a reconfiguration of the output module 40, as it will become clear as the description proceeds.

Each microcontroller 24 further includes an internal timer for monitoring the operation of the associated CPM 10 by verifying that the central processor executes an application program properly within the predetermined time frame (PTF). Each microcontroller 24 sets the internal timer for minimum and maximum time intervals that are acceptable for the execution of the application program. In each cycle of the system operation, the microcontroller 24 performs a special acceptance test, which checks the integrity of output data of the associated central processor module 10 and checks if the application program of this central processor module 10 is executed within the PTF. If the acceptance test rejects the output data of the associated central processor module 10 or if the application program execution time does not lie within the PTF, the respective microcontroller 24 activates an alarm signal 25 that disables all outputs 30 of the associated voter network 32. In this case the microcontroller 24 does not reset the associated watchdog controller 26 hence the watchdog controller 26 overflows and activates the alarm signal 45 which is used for a reconfiguration of the output module 40, as it will become clear as the description proceeds.

There is a difference between the microcontroller 24a and 24b functions on the one hand and the function of the microcontroller 24c on the other hand. The microcontroller 24c monitors operation of both central processor modules 10a and 10b. In each cycle of the system operation, the microcontroller 24 performs the acceptance test for the CPM 10a and for the CPM 10b. In the event that a fault of the CPM 10a or the CPM 10b is detected via the associated acceptance test, the microcontroller 24c disables output data of the faulty CPM 10 and operates with only output data that it received from the healthy CPM 10. In the event that both CPM 10a and CPM 10b fail, the microcontroller 24c disables output data of both CPM 10a and the CPM 10b and activates the alarm signal 25c that, in turn, disables all outputs 30c of the associated voter network 32c. In this case the system performs a shutdown, as it will become clear as the description proceeds.

The microcontroller 24c also compares the output data received from CPM 10a and CPM 10b in each scan. In the event that a disagreement is discovered, the microcontroller 24c either freezes the corresponding outputs until a time when CPM 10a and CPM 10b restore equality of their output data or it continues to implement said selected logical operation with these data. The user via corresponding settings in the application program can chose one of these options.

2. Theory of Operation.

In the embodiment shown in FIGS. 1 and 2, the system 5 is primarily assigned to an emergency shutdown or to a critical ON-OFF control application. In this way, the system produces a single-bit output 39 for each process point. The system 5 performs control functions on a cyclical basis. The central processor modules 10 operate in parallel executing the same application program. Once per scan, the central processors 10 synchronize and each reads input data and diagnostic status of its neighbors over a redundant communication bus 17. During each scan the central processor modules 10a and 10b receive input data from input circuits 15a, 15c, 15b and 15c respectively. The central processor module 10a then transmits input data received from input circuit 15a to the central processor module 10b over the redundant communication bus 17. At the same time the central processor module 10b transmits input data received from input circuit 15b to the central processor module 10a over the redundant communication bus 17. As a result, each central processor module 10 has three sets of input data delivered from input circuits 15a, 15b, and 15c. The CPM 10 then calculates the middle value among three sets of analog input data if it operates with the analog input module 20. The CPM 10 performs two-out-of-three (2-of-3) majority voting of digital input data when it works with the digital input module 20. These techniques allow the system to mask possible input transient failures that may occur in input circuits 15. The CPM 10 then employs the voted input data as input for the application program and sends output data generated by this program to the output module 40.

The central processor module 10a generates a single-bit output data A and sends output data A to the microcontroller 24a over I/O bus 13a. The microcontroller 24a in turn transmits data A to output circuits 22a and 22b over line 21a. At the same time the central processor module 10b generates a single-bit output data B and sends output data B to the microcontroller 24b over I/O bus 13b. The microcontroller 24b in turn transmits data B to output circuits 22b and 22c over line 21b. The output circuit 22b receives output data A and B from microcontrollers 24a and 24b and then generates output 30b as the logical product A^B of these output data.

The central processor modules 10a and 10b also deliver single-bit output data A and B to the microcontroller 24c over I/O bus 13a and 13b respectively. In comparison with microcontrollers 24a and 24b each of which receives only output data A and only output data B respectively, the microcontroller 24c receives both A and B output data. The microcontroller 24c compares output data received from CPM 10a and CPM 10b in each scan. In normal operation, the microcontroller 24c produces a logical sum C=(A+B) of these output data. In the event that a disagreement between A and B data is discovered, the microcontroller 24c, however, either freezes the corresponding outputs until a time when CPM 10a and CPM 10b restore equality of their output data or it continue to produce the logical sum of these data. Setting the corresponding parameters in the user-written application program chooses one of these options. When CPM 10 are first powered up each CPM 10 sends user-defined setting to the microcontroller 24c which is then able to define how to react if a disagreement between A and B data is discovered. In normal operation, the microcontroller 24c can also produces a logical product C=A^B instead of a logical sum C=(A+B) for special system applications, as it will become clear as the description proceeds.

If disagreements between A and B output data are still repeated more times than the predetermined limit, the microcontroller 24c sets its corresponding outputs C to "0"

condition to provide a shutdown. The predetermined limit is defined in the user-written application program and each CPM 10 sends the limit to the microcontroller 24$c$. If C="0" and either A or B is "0" the system performs a shutdown since the system output 39 becomes "0" as will clear from equation (2a) as the description proceeds.

In normal operation the microcontroller 24$c$ transmits the logical sum C to output circuits 22$c$ and 22$a$ over line 21$c$. The output circuit 22$a$ receiving output data A and the logic sum C from microcontroller 24$a$ and microcontroller 24$c$ respectively, generates the logical product A^C of these output data. At the same time, the output circuit 22$c$ receiving the logic sum C and output data B from microcontroller 24$c$ and microcontroller 24$b$ respectively, generates the logical product CAB of these output data. The system output 39 is defined per point as the logical sum of outputs 30$a$, 30$b$, and 30$c$ hence the output 39 is given by the equation:

$$\text{OUTPUT } 39 = A\char`\^C + B\char`\^A + C\char`\^B \quad (1a)$$

As follows from equation (1), the output module 40 perform two-out-of-three majority vote among data A, B, and C produced by microcontrollers 24$a$, 24$b$, and 24$c$ respectively. This technique allows the system to mask possible transient failures that may occur in microcontrollers 24 and logic circuits 28. Taking into account that C=A+B, the system output 39 becomes:

$$\text{OUTPUT } 39 = A\char`\^(A+B) + B\char`\^A + (A+B)\char`\^B = (A+B) + B\char`\^A = A+B \quad (2a)$$

Since the output 39 is provided as the logical sum of output data A and B, the output 39 will be in a logical "1" condition if either output data A or output data B is in the logical "1" condition. A and B data are usually the same in normal system operation but they can be different due to possible transient or hard faults that may occur either in each of CPM 10 or in the communication lines 13. If the system 5 is used as the emergency shutdown system the output 39 will usually be energized, i.e. it will be in the logical "1" condition under normal system operation. The output 39 will be de-energized, i.e. it will be in the logical "0" condition for a shutdown. The system 5 provides two-out-of-two vote between output data A and B produced by central processor modules 10$a$ and 10$b$ respectively as follows from equation (2a). It does mean that the system performs a shutdown by de-energizing the system output 39 only in case that each central processor module 10 produces the logical "0" condition for its associated output data. Consequently, in normal system operation the system output 39 for a given process point will be continuously ON, i.e. energized if at least one out of two central processor modules 10 produces the logical "1" on output data.

For some applications such as Fire and Gas Systems, the system output 39 will usually be de-energized in normal operation and energized for a shutdown. It does mean that the system makes a shutdown only in case that each central processor module 10 produces the logical "1" condition for the associated A and B output data. In this case the microcontroller 24$c$ produces a logical product C=A^B of output data received from CPM 10$a$ and CPM 10$b$ instead of the logical sum of these data. The microcontroller 24$c$ is capable of choosing A+B or A^B logic operation in accordance with instruction that each CPM 10 sends to the microcontroller 24$c$. The instruction, in turn, is defined by user-written application program in accordance with a certain controlled process. For any logic operation the system output 39 is defined as the logical sum of outputs 30$a$, 30$b$, and 30$c$ hence the output 39 will be given by the equation:

$$\text{OUTPUT } 39 = A\char`\^C + B\char`\^A + C\char`\^B$$

If A^B logic operation will be in use, then C=A^B and the system output 39 becomes:

$$\text{OUTPUT } 39 = A\char`\^(A\char`\^B) + B\char`\^A + (A\char`\^B)\char`\^B = A\char`\^B + B\char`\^A + A\char`\^B = A\char`\^B$$

The system performs shutdown by energizing the system output 39 only in case that each central processor module 10 produces the logical "1" condition for the associated output data. Consequently, in normal system operation the system output 39 for a given process point will be continuously OFF, i.e. de-energized if at least one out of two central processor modules 10 produces the logical "0" on output data.

3. Failures Analysis.

We will consider now how the system 5 operates in the presence of a single fault or multiple faults that may occur in system components. The output module 40 is identical to the output module discovered in the U.S. Pat. No. 6,732,300. Hence in our consideration we can use logic equation (7), p. 15 given in "description of the preferred embodiments" of the U.S. Pat. No. 6,732,300 to defining the output 39 as follows:

$$\text{OUTPUT } 39 = Ca\char`\^Wa\char`\^A\char`\^(C\char`\^Wc + A\char`\^(Wc\char`\^Wb)) + Cb\char`\^Wb\char`\^B\char`\^(A\char`\^Wa + B\char`\^(Wa\char`\^Wc)) + + Cc\char`\^Wc\char`\^C\char`\^(B\char`\^Wb + C\char`\^(Wb\char`\^Wa)) \quad (3)$$

In the equation (3), A, B, and C=A+B represent single-bit output data that CPM 10$a$ and 10$b$ transfer to output 21$a$, 21$b$, and 21$c$ of microcontrollers 24$a$, 24$b$ and 24$c$ respectively. Ca, Cb, and Cc represent alarm signals 25$a$, 25$b$, and 25$c$ respectively. Wa, Wb, and Wc represent alarm signals 45$a$, 45$b$, and 45$c$ respectively. Underlines represent inverted values of the corresponding signals. A and B data are usually the same in normal system operation but they can be different due to possible transient or hard faults that may occur either in each of CPM 10 or in the communication lines 13. In normal system operation, Ca=Cb=Cc="1", Wa=Wb=Wc="1". Consequently, for normal system operation of the system 5, equation (3) is transformed to equation 1a:

$$\text{OUTPUT } 39 = A\char`\^C + B\char`\^A + C\char`\^B$$

Taking into account that C=A+B, the system output 39 becomes:

$$\text{OUTPUT } 39 = A\char`\^(A+B) + B\char`\^A + (A+B)\char`\^B = (A+B) + B\char`\^A = A+B$$

Under normal system operation, therefore, the system output 39 is defined as a result of two-out-of-two voting among output data A and B produced by CPM 10$a$ and CPM 10$b$ respectively.

2.1. CPM 10$a$ and CPM 10$b$ Faults.

In the event that CPM 10$a$ fails due to software or hardware malfunction, the microcontroller 24$a$ recognizes that and in response the microcontroller 24$a$ sets an alarm signal 25$a$ to a logical "0" condition. In this case the microcontroller 24$a$ does not reset the associated watchdog controller 26$a$ hence the watchdog controller 26$a$ overflows and sets its alarm signal 45$a$ also to a logical "0" condition for disabling all outputs 30$a$ of the associated voter network 32$a$. The microcontroller 24$c$ recognizes a fault occurred in the CPM 10$a$ and in response the microcontroller 24$c$ utilizes only output data B that it received from the CPM 10$b$, i.e. the microcontroller 24$c$ provides output data C=B. The equation (3), will then transform to:

OUTPUT 39=$B\hat{}B+C\hat{}(B+C)=B+C$

Taking into account that C=B, the system output 39 becomes:

OUTPUT 39=$B+B=B$

In the event that CPM 10b fails due to software or hardware malfunction, the microcontroller 24b recognizes that and in response the microcontroller 24b sets an alarm signal 25b to a logical "0" condition. In this case the microcontroller 24b does not reset the associated watchdog controller 26b hence the watchdog controller 26b overflows and sets its alarm signal 45b also to a logical "0" condition for disabling all outputs 30b of the associated voter network 32b. The microcontroller 24c recognizes a fault occurred in the CPM 10b and in response the microcontroller 24c utilizes only output data A that it received from the CPM 10a, i.e. the microcontroller 24c provides output data C=A. The equation (3), will then transform to:

OUTPUT 39=$A\hat{}(A+C)+C\hat{}C=A+C$

Taking into account that C=A, the system output 39 becomes:

OUTPUT 39=$A+A=A$

In the event that both CPM 10a and CPM 10b fail concurrently, each microcontroller 24 activates the corresponding alarm signals 25 and 45 that disable the corresponding outputs 30 of associated voter networks 32. As a result the system output 39 per point will be in a safe logical "0" condition, i.e. de-energized. As follows from foregoing the system 5 remains operational in the presence of one faulty CPM 10 and the system fails safely in the event that both central processor modules 10 fail concurrently.

2.2. Microcontroller Faults.

In the event that the microcontroller 24 fails, the associated WDC 26 detects this fault and sets the associated 45(W) signal to the "0" condition. It deactivates all outputs 30 of the associated voter network 32. If two microcontrollers 24 fail concurrently, the outputs of two associated voter networks 32 are deactivated but the system 5 remains operational via the third healthy microcontroller 24. In the case that three microcontrollers 24 fail concurrently, the system 5 brings controlled process to a safe state by performing a shutdown. The system 5, therefore, remains operational in the presence of two faulty microcontrollers 24. The shutdown may only occur if all three microcontrollers 24 fail concurrently.

The system output 39 for all possible faults of the microcontrollers 24 are calculated by substituting "0" value for the corresponding signals 45(W) into the equation (3). All possible faults of the microcontrollers 24 and the corresponding system outputs 39 are shown in Table 1. In the presence of a fault in one microcontroller 24 the system 5 still performs the two-out-of-two voting among output data A and B produced by CPM 10a and CPM 10b respectively. The system also continues perform the two-out-of-two voting in the presence of two faulty microcontrollers 24a and 24b if the microcontroller 24c is still healthy. In the presence of faulty microcontrollers 24a and 24c or 24b and 24c, the system operates with one healthy microcontroller 24 providing one-out-of-one voting. The system 5 performs a safety shutdown in only in the event that all three microcontrollers 24 fail concurrently.

2.2. The CPM and Microcontroller Fail Concurrently.

In the event that the CPM 10a and the associated microcontroller 24a fail concurrently, the microcontroller 24a will not be able to detect that the CPM 10a failed. The watchdog controller 26a, however, recognizes a fault occurred in the microcontroller 24a and the watchdog controller 26a then sets the 45a signal to the "0" condition. It deactivates all outputs 30a of the associated voter network 32a. The microcontroller 24c also recognizes a fault occurred in the CPM 10a and in response the microcontroller 24c utilizes only output data B that it received from the CPM 10b, i.e. the microcontroller 24c provides output data C=B. The equation (3), will then transform to:

OUTPUT 39=$B\hat{}B+C\hat{}(B+C)=B+C=B$

In the event that the CPM 10b and the associated microcontroller 24b fail concurrently, microcontroller 24b will not be able to detect that the CPM 10b failed. The watchdog controller 26b, however, recognizes a fault occurred in the microcontroller 24b and the watchdog controller 26b then sets the 45b signal to the "0" condition. It deactivates all outputs 30b of the associated voter network 32b. The microcontroller 24c also recognizes a fault occurred in the CPM 10b and in response the microcontroller 24c utilizes only output data A that it received from the CPM 10a, i.e. the microcontroller 24c provides output data C=A. The equation (3), will then transform to:

OUTPUT 39=$A\hat{}(A+C)+C\hat{}C=A+C=A$

In the event that the CPM 10 and the associated microcontroller 24 concurrently fail, the system reaction is the same as it is in the case when one CPM 10 fails.

A different situation occurs when the CPM 10 and its neighbor microcontroller 24 fail concurrently.

In the event that the CPM 10a and the microcontroller 24c fail concurrently, the microcontroller 24a recognizes a fault occurred in the CPM 10a and the watchdog controller 26a recognizes a fault occurred in the microcontroller 24c. The microcontroller 24a and the watchdog controller 26c then set the corresponding alarm signals 25a, 45a, and 45c to the "0" condition. It deactivates all outputs 30a and 30c of the associated voter network 32a and 32c. The equation (3), will then transform to:

OUTPUT 39=$B\hat{}B=B$

A similar situation occurs when the CPM 10a and the microcontroller 24b concurrently fail. The microcontroller 24a and the watchdog controller 26b then set the corresponding alarm signals 25a, 45a, and 45b to the "0" condition. It deactivates all outputs 30a and 30b of the associated voter network 32a and 32c. Since C=B, the equation (3), will then transform to:

OUTPUT 39=$C\hat{}C=B\hat{}B$

Considering the CPM 10b and neighbor microcontrollers' faults, the system output 39 is similarly defined due to the symmetrical system configuration:

OUTPUT 39=$A\hat{}A=A$, if the CPM 10b and the microcontroller 24c fail,

OUTPUT 39=$C\hat{}C=A\hat{}A=A$, if the CPM 10b and the microcontroller 24a fail.

It follows from the foregoing that the system remains operational although one faulty CPM 10 and one microcontroller 24 has failed.

2.3. Microcontrollers 24 Faults.

In the event that the microcontroller 24 fails, the associated WDC 26 detects this fault and sets the 45(W) signal to the "0" condition. It deactivates all outputs 30 of the associated voter network 32. If two microcontrollers 24 fail concurrently, the outputs of two associated voter networks 32 are deactivated but the system 5 remains operational via the third healthy microcontroller 24. In the case that three microcontrollers 24 fail concurrently, the system 5 brings controlled process to a safe state by performing a shutdown. The system 5, therefore, remains operational in the presence of two faulty microcontrollers 24. The shutdown may only occur if all three microcontrollers 24 fail concurrently.

The system output 39 for all possible faults of the microcontrollers 24 are calculated by substituting "0" value for the corresponding signals 45 into the equation (3). All possible faults of the microcontrollers 24 and the corresponding system outputs 39 are shown in Table 1. In the presence of a fault in one microcontroller 24, therefore, the output module 40 is reconfigured from a two-out-of-three vote to a two-out-of-two vote operating with two healthy microcontrollers 24. In the presence of two faulty microcontrollers 24, the output module 40 still operates with one healthy microcontroller 24 providing one-out-of-one vote. The system 5 via the output module 40 performs a safety shutdown in only in the event that all three microcontrollers 24 fail concurrently.

Table 1

TABLE 1

| Microcontroller 24a | Microcontroller 24b | Microcontroller 24c | Wa | Wb | Wc | System Output 39 |
|---|---|---|---|---|---|---|
| Good | Good | Good | 1 | 1 | 1 | $A\hat{\ }C + B\hat{\ }A + C\hat{\ }B = A + B$ |
| Faulty | Good | Good | 0 | 1 | 1 | $B + C = A + B$ |
| Good | Faulty | Good | 1 | 0 | 1 | $A + C = A + B$ |
| Good | Good | Faulty | 1 | 1 | 0 | $A + B$ |
| Faulty | Faulty | Good | 0 | 0 | 1 | $C = A + B$ |
| Good | Faulty | Faulty | 1 | 0 | 0 | A |
| Faulty | Good | Faulty | 0 | 1 | 0 | B |
| Faulty | Faulty | Faulty | 0 | 0 | 0 | Safe failure (Shutdown) |

In the event, that both the microcontroller 24 and the associated WDC concurrently fail, a fault occurring in the microcontroller 24 may not be discovered since the WDC may hold its 45(W) signal in "1" state. In this case, the output data A, or B, or C on outputs 21a, 21b, and 21c may be incorrect because the corresponding microcontroller failed. In regard to the output module 40, output data A, B, and C can be different due to hard faults or transient faults that may occur in each microcontroller 24 although A and B data produced by CPM 10a and 10b are still true and equal to each to other. As was shown above if signals Ca=Cb=Cc="1" and signals Wa=Wb=Wc="1", the system output 39 is defined by equation:

OUTPUT 39=$A\hat{\ }C+B\hat{\ }A+C\hat{\ }B$

The output module 40, therefore, provides two-out-of-three vote among output data produced by microcontrollers A, B, and C hence the possible incorrect data that occurred on the output 21 of a faulty microcontroller 24 is outvoted.

Another situation occurs when the microcontroller 24 and the neighbor WDC 26 fail concurrently. For instance, if microcontroller 24a and the WDC 26b fail, the 45a signal changes to "0", while the 45b signal can be in the permanent "0" or "1" state due to the WDC 26b fault. The equation (3), will then transform to:

OUTPUT 39=$C\hat{\ }C=C=A+B$, if $Wb$="0"

OUTPUT 39=$B\hat{\ }B+C\hat{\ }(B+C)=B+C=A+B$, if $Wb$="1"

The system output 39 for other possible combinations of microcontrollers 24 and WDCs 26 faults is defined similarly due to the symmetrical system configuration. All combinations of microcontroller 24, WDC 26 faults, and the system output 39 for each combination are shown in Tables 5, 6, and 7.

Table 5

TABLE 5

| Microcontroller 24a fault Wa | WDC 24b fault Wb | WDC 24c fault Wc | System Output 39 |
|---|---|---|---|
| 0 | 0 | 1 | A + B |
| 0 | 1 | 1 | A + B |
| 0 | 1 | 0 | B |
| 0 | 0 | 0 | shutdown |

Table 6

TABLE 6

| Microcontroller 24b fault Wb | WDC 26a fault Wa | WDC 26c fault Wc | System Output 39 |
|---|---|---|---|
| 0 | 0 | 1 | A + B |
| 0 | 1 | 1 | A + B |
| 0 | 1 | 0 | A |
| 0 | 0 | 0 | shutdown |

Table 7

TABLE 7

| Microcontroller 24c fault Wc | WDC 26a fault Wa | WDC 26b fault Wb | System Output 39 |
|---|---|---|---|
| 0 | 0 | 1 | B |
| 0 | 1 | 0 | A |
| 0 | 1 | 1 | A + B |
| 0 | 0 | 0 | shutdown |

It is evident that the system 5 still properly operates in the presence of concurrent faults in any microcontroller 24 and in any watchdog controller 26 as well as in presence of two faulty WDC 26. The system can also operate properly in the presence of certain faults that concurrently occur in one microcontroller 24 and two WDC 26.

2.5. Input Module Faults.

Each CPM 10 includes a watchdog timer (not shown in FIG. 1) that is set for a predetermined time interval. In each scan, the CPM 10 communicate with the associated input circuits 15 over the associated bus 13. In the event that the CPM 10 does not receive input data from the input circuits 15 within the predetermined time interval the watchdog timer expired and flags a fault in the associated input circuits 15. The CPM 10 then stops communications with a faulty input circuit but it continues receiving data from the input circuit 15 that is still healthy.

For example, if input circuit 15a fails, the CPM 10a will operate with input circuit 15c. In this case, the CPM 10b will continue to operate with both 15*b* and 15*c* input circuits. Due to the symmetrical system configuration similar situation occurs in the event that input circuit 15*b* fails. In this case, the CPM 10*b* will operate with input circuit 15*c*, while the CPM 10*a* will continue to operate with both 15*a* and 15*c* input circuits. In the event that input circuit 15*c* fails, CPM 10*a* and CPM 10*b* will only operates with input circuits 15*a* and 15*b* respectively. In each of those scenarios the CPM 10 will revert from the two-out-of-three voting to the two-out-of-two voting.

In the event that two input circuits 15 fail concurrently, such as if both input circuits 15*a* and 15*b* fail concurrently, CPM 10*a* only will receive input data from the input circuit 15*c*. The CPM 10*a* then will transmit input data received from the input circuit 15*c* to the CPM 10*b* to provide parallel operation of both CPMS 10. In the case that input circuits 15*a* and 15*c* fail, only the CPM 10*b* will receive input data from input circuit 15*b* and it will send the associated input data to the CPM 10*a*. Similarly in the event that input circuits 15*b* and 15*c* fail, only the CPM 10*a* will receive input data from input circuit 15*a* and then sends the associated input data to the CPM 10*b*. The system 5, therefore, remains operational in the presence of one or two faulty input circuits. The two-out-of-three voting, however, is compromised after input circuit failure. A hot-spare input circuit (not shown in FIG. 1) can be in use for on-line replacement of a faulty input circuit to restore the two-out-of-three voting.

From the above description, it is evident that the presented Dual/Triple Redundant system has no single point of failure with respect to central processor modules and the system remains operational in the presence of up to two faulty components in output or in input modules.

3. The Second Embodiment of the System

The system 5 alternate embodiment (FIG. 3) comprises an input module 20*a*, an output module 40*a*, a first and a second central processor module 50*a*, 50*b*. The central processor modules 50 operate in parallel. The alternate embodiment also includes an input/output processor (IOP) 52. The central processor modules (CPM) 50*a*, 50*b* communicate each to other and to the IOP 52 over three communication links 17*a*, 17*b*, and 17*c*. The first and the second central processor module 50*a* and 50*b* also communicate with input module 20*a* and output module 40*a* via I/O buses 13*a* and 13*b* respectively. The IOP 52 communicates with input module 20*a* and output module 40*a* via I/O bus 13*c*.

Figure 3:
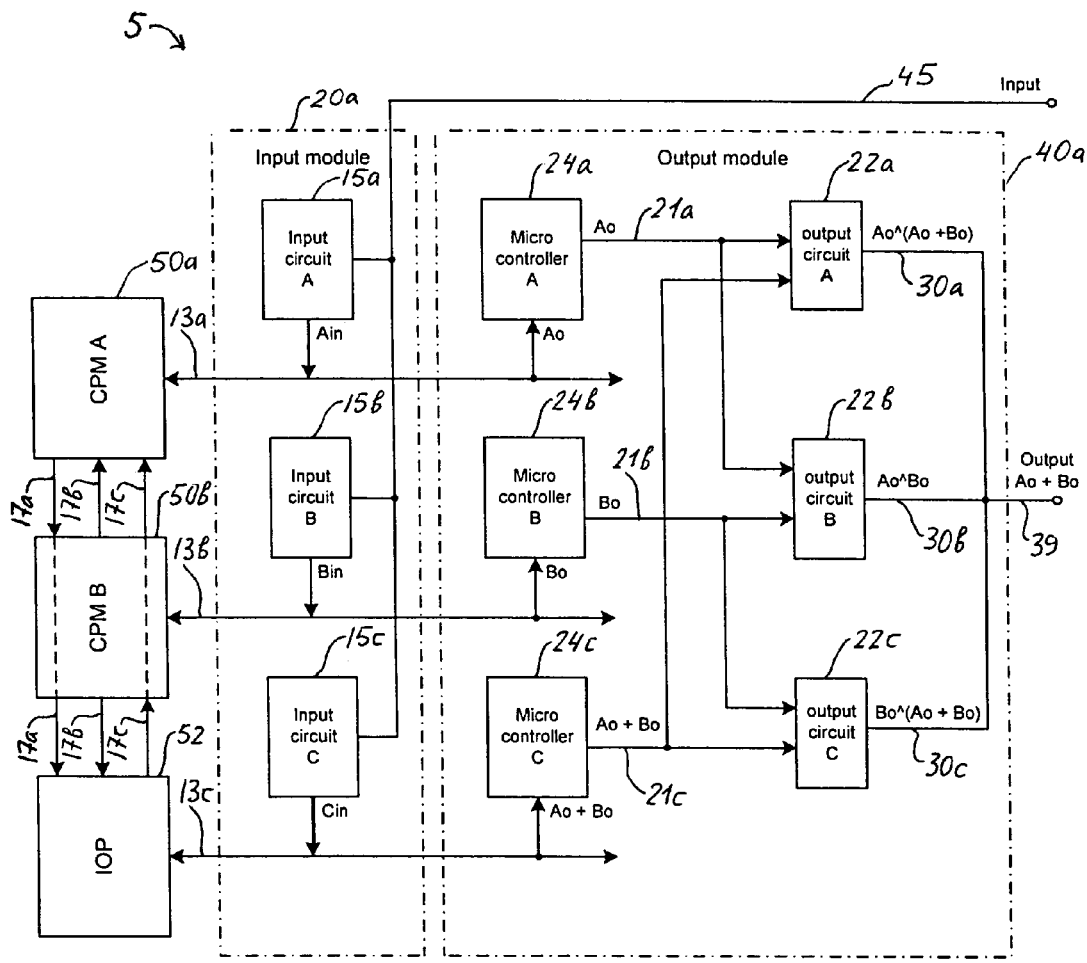
FIG. 3 is a block diagram of a second version of a dual/triple redundant system according to the concept of the present invention.

Referring to FIGS. 2 and 3, input modules 20 and 20*a* in the first and the second system embodiment are similar. A single difference between them is the input circuit 15*c* in the input module 20 is connected to both first and second CPM 10*a*, 10*b*, while the input module 20*a* is only connected to the IOP 52. The output modules 40 and 40*a* are also similar. A difference between them is the output circuit 21*c* in the output module 40 is connected to both first and second CPM 10*a*, 10*b*, while the output module 40*a* is only connected to the IOP 52.

The input module 20*a* comprises three identical input circuits 15. They read the same process data and transmit these data to their mate CPM 50 over I/O buses 13*a*, 13*b*, and 13*c*. These buses are used also for the communication between CPMs 50*a*, 50*b* and associated microcontrollers 24 of the output module 40*a*. Once per scan, the CPM 50*a*, 50*b* and the IOP 52 synchronize and each reads input data and diagnostic status of its neighbors. Separated communication links 17*a*, 17*b*, and 17*c* are respectively used by CPM 50*a*, 50*b*, and the IOP 52 to communicate with each to other in read only mode. Each CPM 50 as well as the IOP 52 utilizes a single transmitter to send copies of input data and diagnostic status to each other over the associated communication link 17. This ensures that the same data the CPM 50*a*, the CPM 50*b* and the IOP 52 will receive. Each CPM 50 as well as the IOP 52 performs two-out-of-three (2-of-3) software majority voting of digital input data when they work with the digital input module 20*a*. Each CPM 50 as well as the IOP 52 calculates the middle value among three sets of analog input data if they operate with the analog input module 20*a*. These techniques allow the system to mask possible input transient failures that would propagate into the further calculations.

Each CPM 50 then executes the application program and writes single-bit output data per point generated each scan by this program to an associated table of memory. The CPM 50*a* and the CPM 50*b* also sends A and B output data respectively to the IOP 52. The IOP 52 then calculates its output data as a logical sum C=A+B. In normal operation A and B data are equal and the IOP 52 writes output data C=A+B to the associated table of memory. The CPM 50*a*, the CPM 50*b*, and the IOP 52 then synchronize via the communication buses 17 and sends output data A, B, C respectively to microcontrollers 24*a*, 24*b*, 24*c* at the same time.

In normal operation each microcontroller 24 transmits output data to the associated output circuit 22. The output circuit 22*a* receives output data A and the logic sum C from microcontroller 24*a* and microcontroller 24*c* and it generates the logical product A^C of these output data. At the same time, the output circuit 22*b* receives output data B and A from microcontroller 24*a* and microcontroller 24*b*, while the output circuit 22*c* receives output data C and B from microcontrollers 24*c* and 24*b*. The output circuit 22*b* and the output circuit 22*b* will then generate respectively logical products B^A and C^B. The system output 39 is defined per point as the logical sum of outputs 30*a*, 30*b*, and 30*c* hence the output 39 is given by the equation:

$$\text{OUTPUT } 39 = A\char`\^C + B\char`\^A + C\char`\^B \quad (1b)$$

In equation (1b) A and B data respectively presents output data produced by the CPM 50*a* and the CPM 50*b*, while C data presents a logical sum C=A+B. A, B, and C output data are equal under normal system operation. But they can be wrong due some malfunction that may appear in some system components. The advantage of the alternate embodiment is that the output module 40*a* provides two-out-of-three majority vote for not only output data produced by microcontrollers 24*a*, 24*b*, and 24*c*, but also for A, B, and C output data produced by CPM 50*a*, the CPM 50*b*, and the IOP. It is especially important in a case that the system 5 operates with remote I/O modules since a long I/O communication links may be susceptible for electromagnetic interference.

Taking into account that C=A+B, the equation (1b) is given as:

$$\text{OUTPUT } 39 = A\char`\^(A+B) + B\char`\^A + (A+B)\char`\^B = (A+B) + B\char`\^A = A+B \quad (2b)$$

Since the output 39 is provided as the logical sum of output data A and B, the output 39 will be in a logical "1" condition if either output data A or output data B is in the logical "1" condition. A and B data are usually the same in normal system operation but they can be different due to possible transient or hard faults that may occur either in each of CPM 50, or in the IOP 52 or in the communication lines 13. If the system 5 is used as the emergency shutdown system the output 39 will usually be energized, i.e. it will be in the logical "1" condition under normal system operation. The output 39 will be de-energized, i.e. it will be in the logical "0" condition for a shutdown. The system 5 provides two-out-of-two vote between output data A and B produced by central processor modules 50a and 50b respectively as follows from equation (2b). It does mean that the system performs a shutdown by de-energizing the system output 39 only in case that each central processor module 50 produces the logical "0" condition for its associated output data. Consequently, in normal system operation the system output 39 for a given process point will be continuously ON, i.e. energized if at least one out of two central processor modules 10 produces the logical "1" on output data.

The IOP 52 compares output data A and B received from CPM 50a and CPM 50b. In the event that a disagreement between A and B data is discovered, the IOP 52 continues to produce the logical sum of these data waiting for a time when CPM 50a and CPM 50b restore equality of their output data. If disagreements between A and B output data are still repeated more times than the predetermined limit, the IOP 52 sets its corresponding outputs C to "0" condition to provide a shutdown. The predetermined limit is defined in the user-written application program and each CPM 50 after first powered up sends this limit to the IOP 52. In the case that A and B output data are continuously different, either A or B output data will be in "0" condition. As it follows from equation (2b), when the IOP 52 sets its corresponding outputs C to "0" condition the system output 30 is de-energized for making a shutdown because two out of three values of output data A, B, and C are in "0" condition.

Referring to FIGS. 2, 3 now consider the system behavior in the presence of faults of system components. As can be appreciated, the configuration of I/O modules 20a and 40a in considered embodiment is the same as the configuration of I/O modules 20 and 40 in the first embodiment described above. Hence, an I/O part of the system 5 that includes I/O modules 20a and 40a operates similarly in first and second embodiments of the system 5. The I/O part of the second embodiment provides the same fault recovery actions in the presence of faulty components that were described above in regard to the first embodiment. The system in second embodiment, therefore, has the same level of fault tolerance that it is provided by the I/O part of the first embodiment. Consequently, the system in the second embodiment remains operational in the presence of any two faulty components in I/O modules.

Now consider the system behavior in the presence of faults in CPM 50a, 50b and IOP 52. In the event that CPM 50a fails due to software or hardware malfunction, the associated microcontroller 24a recognizes that and will pass the associated output 30a to a logical "0" condition, as it was shown in the description of the first embodiment. The microcontroller 24b will then be able to transmit the output data B received from the CPM 50b to the associated output 30b. The IOP 52 recognizes a fault occurred in the CPM 50a and the IOP 52 will utilize only output data B that it received from the CPM 50b. The IOP 52 then transmits output data B to the microcontroller 24c that, in turn, transmits these output data to the associated output 30c. In this case the system output 39 becomes:

OUTPUT 39=$B+B=B$

Due to symmetrical CPM 50 configuration, in the event that CPM 50b fails the system output 39 is defined similarly:

OUTPUT 39=$A+A=A$

In the event that IOP 52 fails the microcontroller 24c recognizes that and will pass the associated output 30c to a logical "0" condition. The system output 39 then becomes:

OUTPUT 39=$A+B$

In the event that both CPM 50a and CPM 50b concurrently fail, the IOP 52 stops operate with faulty CPM 50a and CPM 50b and it sends the logical "0" values of output data to the microcontroller 24c that in response pass output 30c in "0" condition. The same logical "0" condition is set in outputs 30a and 30b, since microcontrollers 24a, 24b recognized faulty state of CPM 50a and CPM 50b. The system output 39, consequently, becomes in "0" condition and the system makes a shutdown in this case. In the event that one CPM 50 and the IOP 52 concurrently fail, however, the system remains operational. The system 5 in the considered embodiment remains operational if at least one CPM 50 and its associated components in I/O modules 20a, 40a are still healthy. The system brings its output 39 in a safe condition making a shutdown in the event that both CPM 50a and CPM 50b concurrently fail. In regard to the I/O part of the considered embodiment the system remains operational in the presence of up two faulty I/O components.

The advantage of the alternate embodiment is that the output module 40a provides two-out-of-three majority vote for not only output data produced by microcontrollers 24a, 24b, and 24c, but also for A, B, and C output data produced by CPM 50a, the CPM 50b, and the IOP. It is especially important in a case that the system 5 operates with remote I/O modules since long I/O communication links may be susceptible for electromagnetic interference. The second embodiment is more expansive since it requires the IOP 52 as the additional component. Notice that the IOP 52 is very simple and can, therefore, be much less expensive than CPM 50a and CPM 50b because the IOP 52 is only used for implementing simple logic operations and it is not using for storing and execution of the application program.

4. The Third Alternate Embodiment

The third embodiment of the system 5 (FIG. 4a) comprises a first central processor module 60a, a second central processor module 60b and an input/output (I/O) subsystem 7. The I/O subsystem 7 can be located on a remote chassis and it is composed of an input module 20a and an output module 40a. The I/O subsystem 7 also includes communication links 17 and includes a first, a second and a third input/output processor (IOP) 29a, 29b, 29c. Each IOP 29 communicates with input module 20a and output module 40a over the associated I/O buses 13. The system 5 may be composed of a plurality of I/O subsystems 7, each of which, in turn, may consist of a plurality of input modules 20a and output modules 40a. The CPM 60a and the CPM 60b respectively communicate with each I/O subsystem 7 over I/O networks 9a and 9b.

Figure 4A:
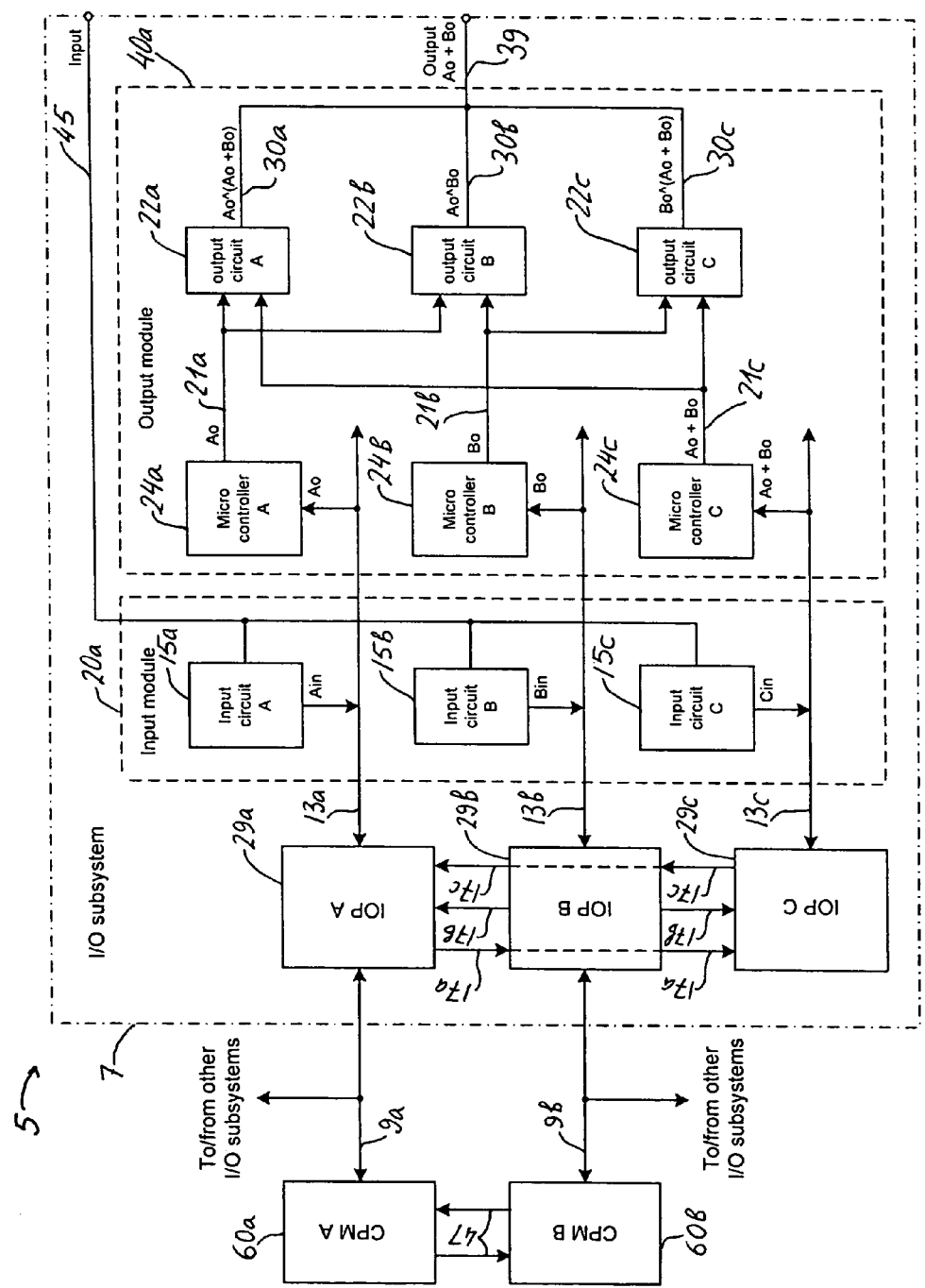
FIGS. 4a and 4b are block diagrams of two variations of a third version of a dual/triple redundant system of the present invention.

Referring to FIGS. 2 and 4a, the first and the third embodiments employ the same configuration of input modules 20a and the same configuration of output modules 40a. The input module 20a comprises three identical input circuits 15. They read the same process data from field devices (not shown in FIG. 4a) over lines 45, and transmits these data to their corresponding IOP 29 over the associated I/O bus 13. Once per scan, each IOP 29 receives input data from the associated input circuit 15 and. The IOPs 29 synchronize each scan and each reads input data and diagnostic status of its neighbors over communication links 17. Separate communication links 17a, 17b, and 17c are used by IOP 29a, 29b and 29c respectively to communicate with each other in read only mode. Each IOP 29 utilizes a single transmitter to send copies of input data and diagnostic status to each other over the associated communication link 17. This ensures that each IOP 29 will deliver the same data to each of the neighboring IOP 29. Each IOP 29, therefore, receives input data from the associated input circuit 15 and receives input data from two neighboring input circuits 15 via two neighboring IOPs. The IOP 29 then performs the two-out-of-three (2-of-3) software majority voting of input data if the digital input module 20a is employed.

If a disagreement is discovered, the correct value of input data in each IOP 29 is found as a result of two-out-of-three voting among three sets of input data. Each IOP will calculate the middle value among three sets of analog input data if the I/O subsystem 7 employs analog input module 20a. These techniques allow the I/O subsystem 7 to mask possible input failures and, therefore, to prepare a correct input data for further transmission them to the first and the second CPM 60a and 60b. The IOP 29a and the IOP 29b then transmit the voted input data to the associated CPM 60 over the associated I/O network 9. The IOP 29c participates with neighbor IOPs in voting but it does not communicate with any of the CPM 60. The IOP 52 also compares output data A and B received from CPM 60a and CPM 60b as it will become clear as the description proceeds.

First and second processor module 60a and 60b receive the voted input data from IOP 29a and 29b, respectively, over I/O network 9a and 9b. CPM 60a and CPM 60b then execute the application program and transfer the output data A and B respectively to the IOP 29a and to the IOP 29b over I/O network 9a and 9b. IOP 29a and IOP 29b, in turn, transmits output data A and B to the IOP 29c over communication links 17a and 17b respectively. The IOP 29c then compare output data A and B received from the IOP 29a and the IOP 29b. In normal operation A and B data are equal and the IOP 29c then calculates its output data as a logical sum C=A+B and writes output data C to the associated table in memory. IOP 29a, IOP 29b, and IOP 29c then synchronize via the communication links 17 and each IOP 29, respectively, sends output data A, B, C to microcontrollers 24a, 24b, 24c at the same time.

In normal operation each microcontroller 24 transmits output data to the associated output circuit 22. The output circuit 22a receives output data A and the logic sum C from microcontroller 24a. The output circuit 22a then generates the logical product A^C of received output data. At the same time, the output circuit 22b receives output data B and A from microcontroller 24a and microcontroller 24b, while the output circuit 22c receives output data C and B from microcontrollers 24c and 24b. The output circuit 22b and the output circuit 22c then generate respectively logical products B^A and C^B. The system output 39 is defined per point as the logical sum of outputs 30a, 30b, and 30c hence the output 39 is given by the equation:

$$\text{OUTPUT } 39 = A^\wedge C + B^\wedge A + C^\wedge B \quad (1c)$$

A and B data present output data produced by the CPM 60a and the CPM 60b respectively, while C data presents a logical sum C=A+B. A, B, and C output data are equal under normal system operation. But they can be wrong due some malfunction that may appear in some system components. The two-out-of-three vote among A, B, and C output data allows the system to mask possible faults that may occur in each IOP 29 as well as in each microcontroller 24 and output circuit 22.

Taking into account that C=A+B, the equation (1c) is given as:

$$\text{OUTPUT } 39 = A^\wedge(A+B) + B^\wedge A + (A+B)^\wedge B = (A+B) + B^\wedge A = A+B \quad (2c)$$

Since the output 39 is provided as the logical sum of output data A and B, the output 39 will be in a logical "1" condition if either output data A or output data B is in the logical "1" condition. A and B data are usually the same in normal system operation but they can be different due to possible transient or hard faults that may occur either in each of CPM 50, or in the IOP 52 or in the communication lines 13. If the system 5 is used as the emergency shutdown system the output 39 will usually be energized, i.e. it will be in the logical "1" condition under normal system operation. The output 39 will be de-energized, i.e. it will be in the logical "0" condition for a shutdown. The system 5 provides two-out-of-two vote between output data A and B produced by central processor modules 50a and 50b respectively as follows from equation (2b). As a result, the system performs a shutdown by de-energizing the system output 39 only in case that each central processor module 50 produces the logical "0" condition for its associated output data. Consequently, in normal system operation the system output 39 for a given process point will be continuously ON, i.e. energized if at least one out of two central processor modules 10 produces the logical "1" on output data.

The IOP 52 compares output data A and B received from CPM 60a and CPM 60b. In the event that a disagreement between A and B data is discovered, the IOP 29c continues to produce the logical sum of these data waiting for a time when IOP 29a and IOP 29b will get the same output data from CPM 60a and CPM 60b. If disagreements between A and B output data are still repeated more times than the predetermined limit, the IOP 29c sets its corresponding outputs C to "0" condition to provide a shutdown. The predetermined limit is defined in the user-written application program and each CPM 60 after first powered up sends this limit to the IOP 29c via the associated IOP 29a and 29b. In the case that A and B output data are continuously different, either A or B output data will be in "0" condition. The system output 30 will then be de-energized to making a shutdown because two out of three values of output data A, B, and C will be in "0" condition when the IOP 29c sets its corresponding output C to "0" condition.

Referring to FIGS. 2 and 4a, now consider the system behavior in the presence of faults of system components. As can be seen, the configuration of I/O modules 20a and 40a in this embodiment is the same as the configuration of I/O modules 20 and 40 in the second system embodiment described above. Hence, an I/O part of the system 5 that includes I/O modules 20a and 40a operates similarly in the second and third embodiments of the system 5. The I/O part of the present embodiment provides the same fault recovery actions in the presence of faulty components that were described above in regard to the second embodiment. The I/O part of the system in the third embodiment, therefore, has the same level of fault tolerance that is provided by the I/O part in the second embodiment. Consequently, the system in the third embodiment remains operational in the presence of any two faulty components in I/O modules.

Now consider how possible faults occurring in IOP 29 and CPM 60 impact the operation of the system 5. In the event that IOP 29a fails due to software or hardware malfunction, the associated microcontroller 24a recognizes that and then sets an alarm signal 25a to a logical "0" condition. In this case the microcontroller 24a does not reset the associated watchdog controller 26a hence the watchdog controller 26a overflows and sets its alarm signal 45a also to a logical "0"

condition to driving each output 30*a* to the logical "0" condition. The IOP 29*b*, however, will transmit output data B received from the CPM 60*b* to the microcontroller 24*b*, that, in turn, transfers output data B to the output 30*b* over the output circuit 22*b*. Since the IOP 29*a* fails, the IOP 29*c* will only deploy output data B that it received from the IOP 29*b*. The IOP 29*c* transmits output data B produced by CPM 60*b* to the microcontroller 24*c* that, in turn, transfer output data B to the output 30*c*. In accordance to equation (3), the system output 39 becomes:

OUTPUT 39=*B*+*B*=*B*

In the event that IOP 29*b* fails due to software or hardware malfunction, the associated microcontroller 24*b* recognizes that and drives the associated output 30*b* to a logical "0" condition. In this case the microcontroller 24*b* does not reset the associated watchdog controller 26*b* hence the watchdog controller 26*b* overflows and sets its alarm signal 45*b* also to a logical "0" condition to drive each output 30*b* to the logical "0" condition. The IOP 29*a*, however, will transmit output data A received from the CPM 60*a* to the microcontroller 24*a* that, in turn, transfers output data A to the output 30*a* over the output circuit 22*a*. Since the IOP 29*b* fails, the IOP 29*c* will only deploy output data A that it received from the IOP 29*a*. The IOP 29*c* transmits output data A produced by CPM 60*b* to the microcontroller 24*c* that, in turn, transfers output data A to the output 30*c*. In accordance to equation (3), the system output 39 becomes:

OUTPUT 39=*A*+*A*=*A*

In the event that the CPM 60*a* fails, the IOP 29*a* recognizes a faulty condition of the CPM 60*a* and sends a command to its respective microcontroller 24*a* to disable the associated output 30*a*. The microcontroller 24*a* in response sets an alarm signal 25*a* to a logical "0" condition. In this case the microcontroller 24*a* does not reset the associated watchdog controller 26*a* hence the watchdog controller 26*a* overflows and sets its alarm signal 45*a* also to a logical "0" condition to drive each output 30*a* to the logical "0" condition. The IOP 29*b*, however, will transmit output data B received from the CPM 60*b* to the microcontroller 24*b* that, in turn, transfer output data B to the output 30*b* over the output circuit 22*b*. The IOP 29*a* also informs IOP 29*b* and IOP 29*c* that the CPM 60*a* fails. Because of that, the IOP 29*c* recognizes a fault occurred in the CPM 60*a* and the IOP 29*c* only deploys output data B that it received from the IOP 29*b*. The IOP 29*c* transmits output data B received from the CPM 60*b* to the microcontroller 24*c* that, in turn, transfers output data B to the output 30*c*. In accordance to equation (3), the system output 39 becomes:

OUTPUT 39=*B*+*B*=*B*

In the event that the CPM 60*b* fails, the system output 39 will define similarly due to symmetrical system configuration:

OUTPUT 39=*A*+*A*=*A*

As was shown above, the system 5 in the present embodiment has no single point of failure in regard to central processor modules and I/O processors. The system 5 is also capable of operating properly in the face of any two faulty components in the I/O modules of the subsystem 7. The system brings its output 39 into a safe condition making a shutdown in the event that CPM 60*a* and CPM 60*b* or IOP 29*a* and IOP 29*b* concurrently fail.

The advantage of the system in the considered embodiment is that its scan rate can be significantly increased since each I/O subsystem 7 performs input data collection and two-out-of-three voting on input data at the same time that the central processor module 60*a* and 60*b* executes the application program. It also allows frees the central processor modules from time consuming voting procedures as well as employing less expensive central processor modules. Now consider how system functions are divided by the CPM 60 and I/O subsystems 7.

First and second processor modules 60*a* and 60*b* operate in parallel in a scan-based mode performing an application program on a cyclical basis. The period of the cycle of system operation is the scan time, which is composed of three elements:

The time required to collect the input data and perform the two-out-of-three majority voting on input data (input poll/voting time)

The time required to execute the application program

The time required to transfer the output data to the output modules and perform the two-out-of-three majority voting on output data (output poll/voting time)

In each cycle of the system 5 implements as follows:

The central processors 60 synchronize each scan via the first communication bus 11 and then each CPM 60 polls the associated IOP 29 for collecting voted input data from each I/O subsystem 7 via the associated I/O network 9. After finishing the input data poll, each central processor module 60 starts to execute the application program employing correct input data as input to the application program so the CPM 60 does not participate in the time consuming voting process. At the same time, each I/O processor 29 in each I/O subsystem 7 collects the next input data and then performs two-out-of-three majority voting of input data to prepare the correct input data for first and second central processor modules 60. After finishing the application program execution, central processors 60 again synchronize and each of them then polls the associated IOP 29 via the associated I/O network 9 to transfer the output data to each I/O subsystem 7. The CPM 60*a* and the CPM 60*b* then begin a next cycle of system operation by polling the associated IOP 29 for collecting fresh input data.

Figure 4B:
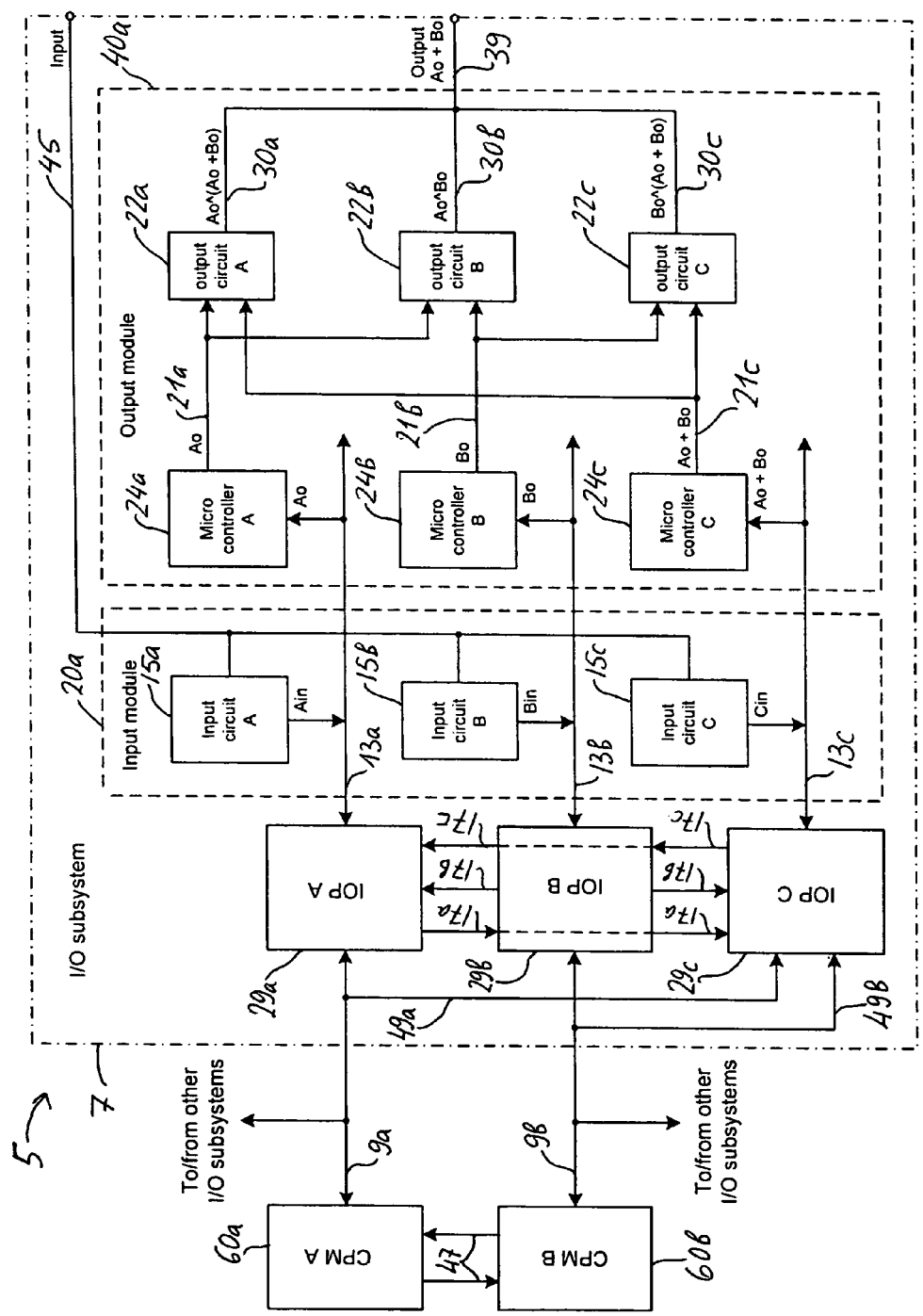

FIG. 4*b* depicts a variation of the considered embodiment where additional links 49*a* and 49*b* are connected to I/O network 9*a* and I/O network 9*b* respectively to provide CPM 60*a* and CPM 60*b* communication with the IOP 29*c* over I/O network 9*a* and 9*b* respectively. Now consider how possible faults occurring in IOP 29 and CPM 60 will impact the operation of this variation of the system 5. In the event that IOP 29*a* fails due to software or hardware malfunction, the associated microcontroller 24*a* recognizes that and will pass the associated output 30*a* to a logical "0" condition. The CPM 60*a* reads the status of the IOP 29*a* in each scan and the CPM 60*a* recognizes a faulty state of the IOP 29*a*. In this case, the CPM 60*a* stops operating with the IOP 29*a* and switches control to the IOP 29*c*.

The CPM 60*a* then transmits its output data A to the IOP 29*c* over the network links 9*a* and 49*a*. The IOP 29*c*, in turn, calculates its output data C as a logical sum C=A+B of output data A that the IOP 29*c* received directly from the CPM 60*a* and output data B that the IOP 29*c* received from the CPM 60*b* via the IOP 29*b*. The IOP 29*c* then sends output data C to the microcontroller 24*c* that, in turn, will transfer these output data to the associated output 30*c*. The microcontroller 24*b* at the same time will transmit the output data B received from the IOP 29*b* to the associated output 30*b*.

In this case the system output 39 becomes:

$$\text{OUTPUT } 39 = B + C = B + (A+B) = B + A$$

In the event that IOP 29*b* fails due to software or hardware malfunction, the associated microcontroller 24*b* recognizes that and will force the associated output 30*b* to a logical "0" condition. The CPM 60*b* reads the status of the IOP 29*b* in each scan and the CPM 60*b* recognizes a faulty state of the IOP 29*b*. In this case, the CPM 60*b* stops operating with the IOP 29*b* and switches control to the IOP 29*c*. The CPM 60*b* then transmits its output data B to the IOP 29*c* over the network links 9*b* and 49*b*. The IOP 29*c*, in turn, calculates its output data C as a logical sum C=B+A from output data that the IOP 29*c* received directly from the CPM 60*b* and output data A that the IOP 29*c* received from the CPM 60*a* via the IOP 29*a*. The IOP 29*c* then sends output data C to the microcontroller 24*c* that, in turn, will transfer these output data to the associated output 30*c*. The microcontroller 24*a* at the same time will transmit the output data A received from the IOP 29*a* to the associated output 30*a*.

In this case the system output 39 becomes:

$$\text{OUTPUT } 39 = A + C = A + (A+B) = A + B$$

In the event that both IOP 29*a* and IOP 29*b* fail concurrently, the CPM 60*a* and the CPM 60*b* will only operate with the IOP 29*c*. The CPM 60*a* and the CPM 60*b* will transmit output data A and B respectively to the IOP 29*c*. Faulty condition of IOP 29*a* and 29*b* is recognized by the associated microcontroller 24*a* and 24*b* respectively, each of which then forces its associated output 30 to be in a logical "0" condition. The system output 39 is defined as:

$$\text{OUTPUT } 39 = C = A + B$$

Referring to the equation (3) and FIGS. 2 and 4*b*, now consider the system behavior in the presence of faults in central processor modules 60. In the event that the CPM 60*a* fails, the IOP 29*a* recognizes a faulty condition of the CPM 60*a* and sends a command to its respective microcontroller 24*a* to disable the associated output 30*a*. The microcontroller 24*a* in response sets an alarm signal 25*a* to a logical "0" condition. In this case the microcontroller 24*a* does not reset the associated watchdog controller 26*a* hence the watchdog controller 26*a* overflows and sets its alarm signal 45*a* also to a logical "0" condition to drive each output 30*a* to the logical "0" condition.

The IOP 29*b*, however, will transmit output data B received from the CPM 60*b* to the microcontroller 24*b* that, in turn, transfer output data B to the output 30*b* over the output circuit 22*b*. The IOP 29*a* also informs IOP 29*b* and IOP 29*c* that the CPM 60*a* fails. Because of that, the IOP 29*c* recognizes a fault occurred in the CPM 60*a* and the IOP 29*c* only deploys output data B that it received from the IOP 29*b*. The IOP 29*c* transmits output data B received from the CPM 60*b* to the microcontroller 24*c* that, in turn, transfers output data B to the output 30*c*. In accordance to equation (3), the system output 39 becomes:

$$\text{OUTPUT } 39 = B + B = B$$

In the event that the CPM 60*b* fails, the system output 39 will be defined similarly due to symmetrical system configuration:

$$\text{OUTPUT } 39 = A + A = A$$

As it was shown above the system 5 in the considered embodiment remains operational in the presence of one faulty CPM 60 and it is capable operating properly in the presence of any two faulty components in the I/O subsystem 7. The system brings its output 39 to a safe condition making a shutdown in the event that both CPM 60*a* and CPM 60*b* fail concurrently.

5. The Fourth Alternate Embodiment

Figure 5A:
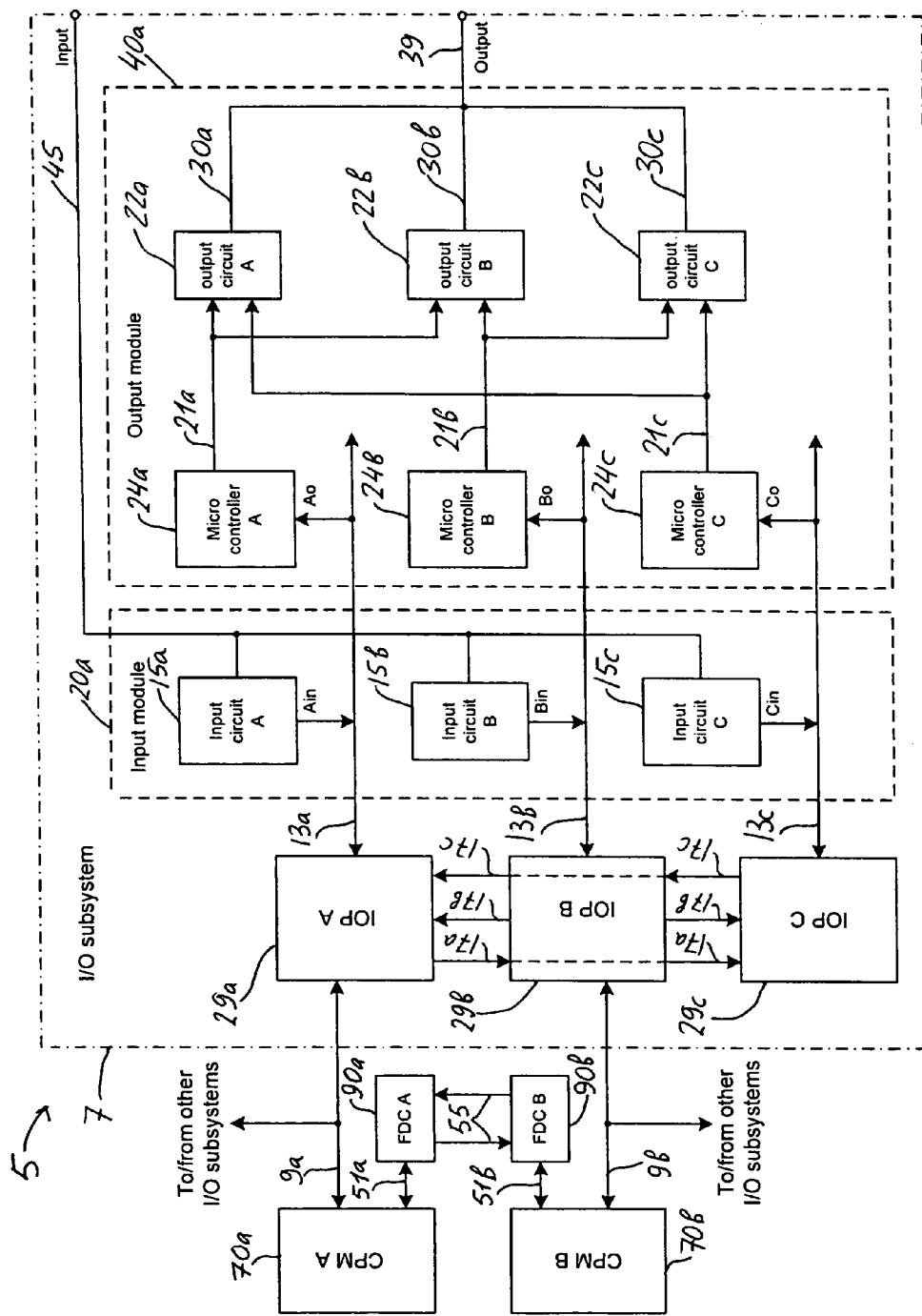
FIGS. 5a, 5b and 6 are block diagrams of three variations of a fourth version of a dual/triple redundant system of the present invention.

FIG. 5*a* depicts the fourth embodiment of the system 5. Referring to FIGS. 4*a* and 5*a* the third and the fourth embodiments employ the same I/O subsystem 7 that includes a plurality of I/O modules 20*a*, 40*a* and a first, a second, and a third input/output processors (IOP) 29*a*, 29*b*, 29*c*. The considered embodiment, however, differs with the third embodiment in that it operates in hot standby mode in regard to central processor modules 70 and it has an additional fault detector circuit (FDC) 90 for each central processor module 70. The FDC 90*a* and the FDC 90*b* communicate with its respective CPM 70 over associated communication links 51 and they communicate with each to other over communication links 55. Each FDC 90 includes an internal timer for monitoring operation of the neighboring FDC 90. This will become clear as the description proceeds.

In accordance with the well-known hot standby technique, one of the CPM 70 is on-line acting as a primary CPM. The primary CPM 70 runs an application program and communicates with the I/O subsystem 7 over the associated I/O network 9. The other CPM 70 is off-line acting as a hot standby CPM. Each CPM 70 can be set in primary state, but to do this, the other CPM must be in standby state. In the event that the primary CPM 70 fails, the hot standby CPM 70 is switched to on-line state and it now becomes the primary CPM. A faulty CPM can then be replaced on-line by a healthy one that will act then as the hot standby CPM.

The system in the considered embodiment operates in a scan-based mode performing system functions on a cyclical basis. The I/O subsystem 7 collects input data from input modules 20*a* each scan and performs a two-out-of-three voting on input data produced by three redundant input circuits 15 located in each input module 20*a*. IOP 29 synchronize each scan over the communication links 17. Each IOP 29 receives input data from the associated input circuit 15 and then transfers these data to neighboring IOP 29 over the communication links 17. Separate communication links 17*a*, 17*b*, and 17*c* are used by IOP 29*a*, 29*b*, and 29*c* respectively to communicate with each other in read only mode. Each IOP 29 utilizes a single transmitter to send copies of input data and diagnostic status to each other over the associated communication link 17. This ensures that each IOP 29 will deliver the same data to each of the neighboring IOP 29. Each IOP then performs a two-out-of-three voting among input data produced by input circuits 15*a*, 15*b*, and 15*c*.

If a disagreement is discovered, the correct value of input data in each IOP 29 is found as a result of two-out-of-three voting among three sets of input data. Each IOP will calculate the middle value among three sets of analog input data if the I/O subsystem 7 employs analog input module 20*a*. These techniques allow the I/O subsystem 7 to mask possible input failures and, therefore, to prepare a correct input data for further transmission them to the CPM 70*a* or to the CPM 70*b*.

Now consider operation of the primary CPM 70. If, for instance, the CPM 70*a* is the primary CPM it will communicate with the I/O subsystem 7. At each scan, the CPM 70*a* will receive voted input data from the IOP 29*a* over the input/output network 9*a* and employ these input data as input to the application program. The CPM 70*a* executes the application program and then transfers its output data A to the IOP 29*a* over the input/output network 9*a*. The IOP 29*a*, in turn, transmits these output data to IOP 29*b* and IOP 29*c* at the same time over communication link 17*a*. IOP 29*a*, IOP 29*b*, and IOP 29*c* then synchronize over the communication links 17 and each IOP 29 sends the same output data A to the respective microcontroller 24. The output module 40a then performs the two-out-of-three voting among output data produced by microcontrollers 24a, 24b, and 24c. The two-out-of-three vote among these output data allows the system to mask some faults that may occur in each IOP 29 as well as in each microcontroller 24 and in each output circuit 22.

The system output 39 is defined per point as the logical sum of outputs 30a, 30b, and 30c hence the output 39 is given by the equation:

$$\text{OUTPUT 39}=A+B+C \tag{1d}$$

In equation (1d) A, B, and C output data presents output data produced by IOP A, IOP B, and IOP C respectively. In normal system operation, output data B and C are equal to output data A and the system output 39 is then defined as:

$$\text{OUTPUT 39}=A+A+A=A \tag{2d}$$

Now consider the system behavior in the presence of faults in central processor modules 70. The fault detector module (FDC) 90 continuously monitors the status of the associated CPM 70 over communication link 51 to detect possible faults in this CPM. The FDC 90 then sends the status of the associated CPM to the neighboring FDC 90 over the associated communication link 55 to allow each CPM 70 in each scan to read the status of the neighboring CPM. The FDC 90 also allows the primary CPM 70 to update the standby CPM 70 in each scan. At the beginning of each scan, the primary CPM transfers the current state of its RAM consisting of valued variables and registers to the standby CPM 70 via the associated and neighboring FDC 90. These RAM data are critical for providing bumpless switchover to the standby CPM 70 in the event that the primary CPM 70 fails.

If the CPM 70a is the primary CPM, it transfers the current state of its RAM data to the FDC 90a at the beginning of each scan. The FDC 90a then transmits the contents of RAM data to the FDC 90b that, in turn, transmits this information to the standby CPM 70b. The CPM 70b then executes an application program to be ready for assuming on-line state within one scan if the CPM 70a fails. The FDC 90a also continuously monitors the status of the CPM 70a to detect possible faults in the CPM 70a. In the event that the CPM 70a fails, the FDC 90a deactivates the output of the CPM 70a and sends a faulty status of the CPM 70a to the neighboring FDC 90b. The FDC 90b in response enables output of the CPM 70b and initiates the CPM 70b to switch to the on-line state.

Now the CPM 70b becomes the primary CPM and it starts to communicate with I/O subsystem 7 over the input/output network 9b. The CPM 70b receives voted input data from the IOP 29b over the input/output network 9b and employs these input data as input to the application program. The CPM 70a executes the application program and then transfers its output data B to the IOP 29b over the input/output network 9b. The IOP 29b, in turn, transmits these output data to IOP 29a and IOP 29c at the same time over communication link 17b. IOP 29a, IOP 29b, and IOP 29c then synchronize over the communication links 17 and each IOP 29 sends the same output data A to the associated microcontroller 24 at the same time. The output module 40a then performs the two-out-of-three voting among output data produced by microcontrollers 24a, 24b, and 24c. The two-out-of-three vote among these output data allows the system to mask some faults that may occur in each IOP 29 as well as in each microcontroller 24 and in each output circuit 22.

The system output 39 is defined per point as the logical sum of outputs 30a, 30b, and 30c hence the output 39 is given by the equation:

$$\text{OUTPUT 39}=B+A+C \tag{1e}$$

A, B and C output data present output data produced by IOP A, IOP B, and IOP C respectively. In normal system operation, output data A and C are equal to output data B and the system output 39 is then defined as:

$$\text{OUTPUT 39}=B+B+B=B \tag{2e}$$

As follows from foregoing, the system remains operational in the presence of one faulty CPM. The system may also still operate properly in the presence of a faulty FDC 90. For instance, in the event that the FDC 90a fails, the neighbor FDC 90 recognizes it and in response enables output of the CPM 70b for switching the CPM 70b to the on-line state. Each CPM 70 periodically reads the status of the associated FDC 90 to detect possible faults that may occur in the FDC 90. In the event that the FDC 90a fails, the CPM 70a recognizes it and activates an alarm to annunciate the need for the faulty FDC to be replaced by a healthy one to restore normal system operation. The CPM 70a also informs the associated IOP 29a that the CPM 70b becomes a primary CPM. A similar situation occurs when the primary CPM 70a and the associated FDC 90a fail concurrently. In this case, the FDC 90b recognizes a faulty condition of the FDC 90a and the FDC 90b then initiates the CPM 70b to be on-line. The IOP 29a, in turn, also recognizes a faulty condition of the CPM 70a and it will communicate with the IOP 29b for sending/receiving input/output data and to/from the IOP 29b that will communicate directly with the CPM 70b.

Referring to FIGS. 4a and 5a, now consider the system behavior in the presence of faults in the input/output subsystem 7. As can be seen, the input/output subsystems 7 in the third and fourth embodiments are composed of the same components arranged in the same configuration. I/O modules 20a and 40a in the considered embodiment are the same as in the third embodiment described above. Hence, an I/O part of the system 5 that includes I/O modules 20a and 40a operates similarly to the third and fourth embodiments of the system 5. The system in the fourth embodiment, therefore, has the same level of fault tolerance in regard to the I/O part that the embodiment provides. Consequently, the system in the fourth embodiment remains operational in the presence of any two faulty components in I/O modules.

Now consider how possible faults occurring in IOP 29 impact the operation of the system 5. In the event that IOP 29a fails due to software or hardware malfunction, the associated microcontroller 24a recognizes that and drives the associated output 30a to a logical "0" condition. The CPM 70a reads the status of the IOP 29a in each scan and the CPM 70a recognizes a faulty state of the IOP 29a. The CPM 70a stops operation with the IOP 29a and then commands the FDC 90a to send the interrupt signal to the neighboring FDC 90b to drive the CPM 70b to on-line state. Now the CPM 70b becomes the primary CPM and it transmits output data B to the IOP 29b over I/O network 9b. The IOP 29b transfers output data B to the microcontroller 24b that, in turn, transfers output data B to the output 30b over the output circuit 22b. Since the IOP 29a fails, the IOP 29c deploys only output data B that it received from the IOP 29b. The IOP 29c transfers output data B to the microcontroller 24c that, in turn, transfer output data B to the output 30c. In accordance to equation (3), the system output 39 becomes:

OUTPUT 39=*B+B=B*

In the event that IOP 29*b* fails due to software or hardware malfunction, the associated microcontroller 24*b* recognizes that and drives the associated output 30*b* to a logical "0" condition. Since the IOP 29*b* fails, the IOP 29*c* deploys only output data A that it received from the IOP 29*a*. The IOP 29*c* transfers output data A to the microcontroller 24*c* that, in turn, transfers output data A to the output 30*c*. In accordance to equation (3), the system output 39 becomes:

OUTPUT 39=*A+A=A*

In the event that both IOP 29*a* and IOP 29*b* fail concurrently, the associated outputs 30*a* and 30*b* are driving in "0" condition. The IOP 29*c* recognizes faulty state IOP 29*a* and IOP 29*b* and then sets its output 30*c* in "0" state. The system output 39, consequently, is driving to the safe "0" condition, i.e. the system performs shutdown.

As was shown above, the system 5 in the present embodiment has no single point of failure in regard to CPM 70 and FDC 90 and the system is capable of operating properly in the presence of any two faulty components in the I/O modules of the subsystem 7. The system brings its output 39 to a safe condition making a shutdown in the event that both CPM 70, or FDC 90, or both IOP 29*a* and IOP 29*b* fail concurrently.

Figure 5B:
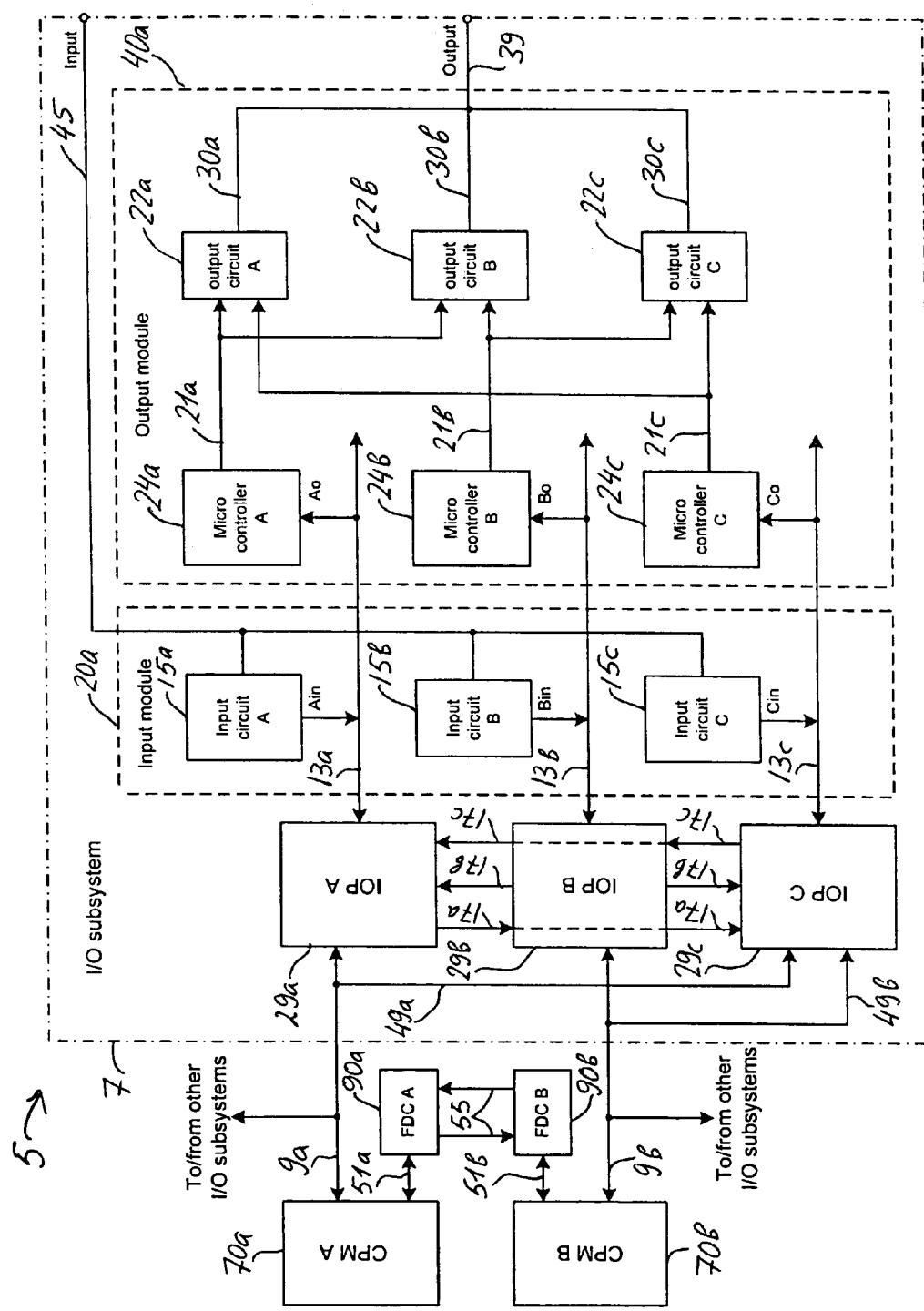

FIG. 5*b* depicts a variation of the considered embodiment that includes additional links 49*a* and 49*b* for providing CPM 70*a* and CPM 70*b* communication to the IOP 29*c* over I/O network 9*a* and 9*b* respectively. Now consider how the system shown in FIG. 5*b* acts when some faults occur in IOP 29. In the event that IOP 29*a* fails due to software or hardware malfunction, the associated microcontroller 24*a* recognizes that and drives the associated output 30*a* to a logical "0" condition. In this case, the CPM 70*a* stops operating with the IOP 29*a* and then transmits its output data A to the IOP 29*c* over the I/O network 9*a*. The IOP 29*c*, in turn, transfers these output data A to the IOP 29*b*. IOP 29*c* and IOP 29*b* then synchronize and each of them sends its output data to its respective microcontroller 24*c* and 24*b*. The microcontrollers 24*c* and 24*b* in turn transmit the associated output data to the outputs 30*c* and 30*b* respectively via the associated output circuits 22.

In this case the system output 39 becomes:

OUTPUT 39=*A+A=A*

In the event that IOP 29*b* fails due to software or hardware malfunction, the associated microcontroller 24*b* recognizes that and drives the associated output 30*a* to a logical "0" condition. The IOP 29*a* transfers output data A received from the CPM 70*a* to the IOP 29*c*. IOP 29*a* and IOP 29*c* then synchronize and each of them sends its output data A to its respective microcontroller 24*a* and 24*c*. The microcontrollers 24*a* and 24*c* in turn transmit the associated output data to the outputs 30*a* and 30*c* respectively via the associated output circuits 22.

In this case the system output 39 is defined as:

OUTPUT 39=*A+A=A*

In the event that both IOP 29*a* and IOP 29*b* fail concurrently, the system will still be able to operate properly since either the CPM 70*a* or the CPM 70*b* will operate with the IOP 29*c*.

As was shown above the system 5 in the present variation has no single point of failure in regard to CPM 70 and FDC 90 operation, and the system is capable of operating properly in the presence of any two faulty components in the I/O subsystem 7. The system brings its output 39 to a safe condition making a shutdown in the event that both CPM 70*a* and CPM 70*b* or IOP 29*a*, 29*b*, and 29*c* fail concurrently.

The system in the fourth embodiment can avoid many problems related to implementation of the precision synchronization that is required when two redundant CPMs operate in parallel. The major difficulty with this embodiment is that it does not provide any voting for output data produced by the CPM. Since only a single output is produced, a single non detected fault can cause a system failure. The system, consequently, requires very high level of fault coverage that each FDC 90 shall provide. Each IOP 29 shell also include error detection and correction means to prevent possible erroneous values on system outputs as the results of transient faults that may occur during transfer of output data from the CPM 70 to the associated IOP 29.

5. The Fifth Alternate Embodiment

Figure 6:
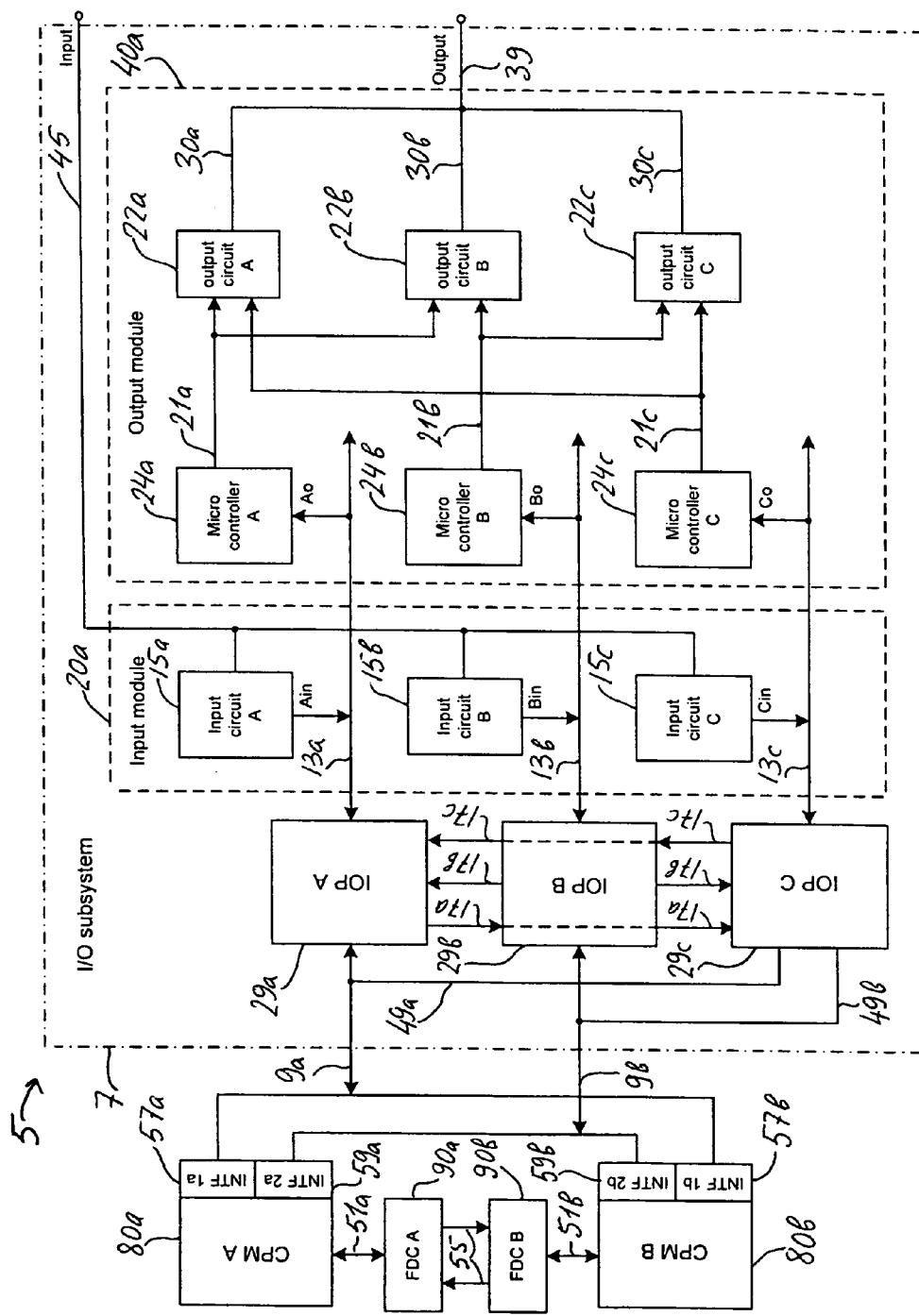

FIG. 6 depicts the fifth embodiment of the system 5. Referring to FIGS. 6 and 5*b* the fourth and the fifth embodiments employ the same I/O subsystem 7 that includes a plurality of I/O modules 20*a*, 40*a* and a first, a second, and a third input/output processors (IOP) 29*a*, 29*b*, 29*c*. The system 5 in the fifth embodiment may also be composed of a plurality of I/O subsystems 7, each of which, in turn, may consist a plurality of input modules 20*a* and output modules 40*a*. The systems in the fourth and fifth embodiments operate in a similar way. The fifth embodiment, however, allows each CPM 80 to still be the primary CPM in the presence of a fault in the associated I/O network 9.

The present embodiment differs from the third embodiment in that each central processor module (CPM) 80 includes two I/O interfaces: a first interface 57 and a second interface 59. I/O interfaces 57*a* and 57*b* are connected to each other and are connected to the I/O network 9*a*, while I/O interfaces 59*a* and 59*b* are connected to each other and connected to the I/O network 9*b*.

Since each CPM 80 has two I/O interfaces, the primary CPM 80 is capable of operating with the I/O subsystem 7 in the presence of a fault in the I/O network 9*a*. If, for instance, the CPM 80*a* is the primary CPM, it operates with the I/O subsystem 7 over I/O interface 57*a*, I/O network 9*a*, and IOP 29*a* under normal operation. I/O interfaces 57*b* and 59*a*, 59*b* are disabled. In the event that the I/O network 9*a* or I/O interface 57*a* fail, the CPM 80*a* switches control to the I/O interface 59*a* and then starts operating with the I/O subsystem 7 over I/O interface 59*a*, I/O network 9*b*, and IOP 29*b*.

If the CPM 80*b* is the primary CPM, it operates with the I/O subsystem 7 over I/O interface 57*b*, I/O network 9*a*, and IOP 29*a* under normal operation. I/O interfaces 57*a* and 59*a*, 59*b* are disabled. In the event that the I/O network 9*a* or I/O interface 57*b* or IOP 29*a* fail, the CPM 80*b* switches control to the I/O interface 59*b*. The CPM 80*b* then starts operate with the I/O subsystem 7 over I/O interface 59*b*, I/O network 9*b*, and IOP 29*b*.

The configuration of the considered embodiment of the system 5 is similar to the fourth embodiment. The system in this embodiment, therefore, has no single point of failure in regard to CPM 70, FDC 90, and I/O networks 9 and it is capable of operating properly in the presence of any two faulty components in the I/O subsystem 7. The system brings its output 39 to a safe condition making a shutdown in the event that both CPM 80*a* and CPM 80*b* or IOP 29*a*, 29*b*, and 29*c* fail concurrently.

It can be seen from the foregoing that the present invention achieves the objects stated above. It will be understood that various combinations and modifications may be made to the exemplary variations described above without departing from the spirit of the present invention, and, thus for an appreciation of the scope of the present invention, reference should be made to the following claims.

What is claimed is:

1. A dual/triple redundant computer system comprising:
 a) a first and a second central processor modules operating in parallel, each central processor module has means for executing an application program;
 b) at least one input module included a first, a second, and a third input circuits operating in parallel;
 c) at least one output module including a first, a second, and a third microcontrollers operating in parallel;
 d) the first central processor module connected to the first input circuit and to the third input circuit for receiving input data from said input circuits;
 e) the second central processor module connected to the second input circuit and to the third input circuit for receiving input data from said input circuits;
 f) said first and second central processor module connected to each to other said first central processor module to transmit input data received from said first input circuit to said second central processor module and allowing said second central processor module to transmit input data received from said second input circuit to said first central processor module;
 g) means in each central processor module for performing a two-out-of-three voting among input data produced by said first, second, and third input circuits, for using a result of said two-out-of-three voting as input to said application program to provide output data by execution of said application program;
 h) said first central processor module further connected to said first microcontroller and to said third microcontroller for delivering said output data to each of said microcontrollers;
 i) the second central processor module further connected to said second microcontroller and to said third microcontroller for delivering said output data to each of said microcontrollers;
 j) means in said first and said second microcontroller for delivering said output data produced respectively by said first and said second central processor module on an output of the associated microcontroller;
 k) means in said third microcontroller for implementing a selected logic operation with said output data produced by said first and second central processor modules, and for transferring a result of said selected logic operation on an output of said microcontroller;
 l) said third microcontroller further has means for storing a set of said selected logic operations and for allowing said application program to select a certain logic operation from said set of selected logic operations;
 m) said output module further including a first, a second, and a third output circuit, each of said output circuits is connected to the associated microcontroller and to the neighbor microcontroller for receiving output data produced by said microcontrollers, for performing a logical product of said output data, and for transferring said logical product on an output of said output circuit;
 n) said first output circuit is connected to said first and third microcontrollers for receiving the output data produced by said microcontrollers and for performing the logical product of said output data, thereby allowing said first output circuit to generate its output as the logical product of the output data produced by said first central processor module and the result of said selected logical operation;
 o) said second output circuit is connected to said second and first microcontroller for receiving output data produced by said microcontrollers and for performing the logical product of said output data, thereby allowing said second output circuit to generate its output as the logical product of the output data produced by said second and first central processor modules;
 p) said third output circuit is connected to said third and second microcontrollers for receiving the output data produced by said microcontrollers and for performing the logical product of said output data, thereby allowing said third output circuit to generate its output as the logical product of the result of said selected logical operation and the output data produced by said second central processor module;
 q) the outputs of said first, second, and third output circuit are connected to each other to provide a two-out-of-three voting among output data produced by the first, second, and third microcontrollers, thereby allowing the system to generate a system output as a result of a two-out-of-two voting of output data generated by first and second central processor modules;
 r) means in the first and the second microcontroller for detecting the occurrence of a fault within the associated central processor module, and for activating an alarm signal in the event that said central processor module fails;
 s) means in the third microcontroller for detecting the occurrence of a fault within the first and the second central processor module and for receiving output data only from one of said central processor modules that has not failed, and for activating an alarm signal in the event that both first and second central processor module concurrently fail;
 t) means in the output module for generating the system output as the result of said two-out-of-two voting among data produced by said first and second central processor modules if said alarm signal in each of said microcontrollers is not activated, for generating the system output by only using output data received from one of said central processor modules if said alarm signal associated with a faulty central processor module is activated and for disabling said output if each alarm signal is activated, thereby allowing the output module to revert from said two-out-of-two voting to a one-out-of-one voting in the event that the first or the second central processor module fails, and forcing the system output to be in the predetermined safe output condition in case that both first and second central processor modules concurrently fail;
 u) means in the output module for detecting the occurrence of a fault within each microcontroller and for respectively activating said first, second, and third alarm signal in the event that first, or the second, or the third microcontroller fails;
 v) means in each output circuit for generating its output as a logical product of output data received from the associated and the neighbor microcontroller if no one of said alarm signals is not activated, for generating said output by only using output data received from the associated microcontroller if at least one out of two alarm signals associated with neighbor microcontrollers is activated, for disabling said output if the associated microcontroller fails and the associated alarm signal is activated, thereby allowing said output module to revert from said two-out-of-three voting among output data produced by said first, second, and third microcontroller to a two-out-of-two voting in the event that one microcontroller fails, to a one-out-of-one voting in the event that that two microcontroller concurrently fail, and to the predetermined safe output condition in the event that each microcontroller fail;

w) means in each microcontroller for reading status of the associated output circuit and disabling the output of said output circuit if a fault of said output circuit is discovered;

x) means in each central processor module for reading status of the associated input circuits and disabling input data of said input circuit if a fault of said input circuit is discovered; and y) means in each central processor modules for synchronizing its operation with the operation of neighbor central processor modules and for providing scan-based mode of system operation to perform said application program execution on a cyclical basis.

2. The hybrid multiple redundant computer system of claim 1 wherein:

a) the third microcontroller has means for calculating the result of the selected logic operation as a logical sum of the output data produced by the first and the second central processor modules;

b) said third microcontroller further has means for comparing each scan output data received from the first and the second central processor module, for freezing the output of said third microcontroller if a disagreement between said output data is discovered and for producing a logical "0" value on said output to perform a shutdown if said disagreement is repeated more times that is defined by a predetermined limitation established in the application program;

c) means in the first and the second microcontroller for detecting the occurrence of a fault within the associated central processor module, and for activating an alarm signal in the event that said central processor module fails;

d) means in the third microcontroller for detecting the occurrence of a fault within the first and the second central processor module and for receiving output data only from one of said central processor modules that has not failed, and for activating an alarm signal in the event that both first and second central processor module concurrently fail;

e) means in the output module for generating the system output as the result of said two-out-of-two voting among data produced by said first and second central processor modules if said alarm signal in each of said microcontrollers is not activated, for generating the system output by only using output data received from one of said central processor modules that has not failed if said alarm signal associated with a faulty central processor module is activated and for disabling said output if each alarm signal is activated, thereby allowing the output module to revert from said two-out-of-two voting to a one-out-of-one voting in the event that the first or the second central processor module fails, and forcing the system output to be in the predetermined safe output condition in case that both first and second central processor modules concurrently fail;

f) said output module further including a first, a second, and a third watchdog controller each of which connected to the associated microcontroller for detecting the occurrence of a fault within said microcontroller and for activating an alarm signal in the event that the associated microcontroller fails;

g) each said output circuit is further connected to the associated watchdog controller and connected to neighbor watchdog controllers for receiving said alarm signal from any of said watchdog controllers;

h) means in each output circuit for generating its output as a logical product of output data received from the associated and the neighbor microcontroller if said alarm signal in each of said watchdog controllers is not activated, for generating said output by only using output data received from the associated microcontroller if at least one out of two alarm signals produced by the neighbor watchdog controllers is activated, and for disabling said output if the alarm signal produced by the associated watchdog controller is activated, thereby allowing the associated output module to revert from two-out-of-three voting among output data produced by said first, second, and third microcontroller to the two-out-of-two voting in the event that that one microcontroller fails, to the one-out-of-one voting in the event that two microcontroller concurrently fail, and to the predetermined safe output condition in the event that each microcontroller fail;

i) said means in the first output circuit for generating its output as a logical product of output data received from the first microcontroller and said logical sum if said alarm signal in each of said watchdog controllers is not activated, generating said output by only using output data received from the first microcontroller if at least one out of two alarm signals produced by second and third watchdog controllers is activated, and for disabling said output if the alarm signal produced by the first watchdog controller is activated;

j) said means in the second output circuit for generating its output as a logical product of output data received from second and first microcontrollers if said alarm signal in each of said watchdog controllers is not activated, generating said output by only using output data received from the second microcontroller if at least one out of two alarm signals produced by first and third watchdog controllers is activated, and for disabling said output if the alarm signal produced by the second watchdog controller is activated; and k) said means in the third output circuit for generating its output as a logical product of said logical sum and output data received from the second microcontroller if said alarm signal in each of said watchdog controllers is not activated, generating said output by only using said logical sum if at least one out of two alarm signals produced by first and second watchdog controllers is activated, and for disabling said output if the alarm signal produced by the third watchdog controller is activated.

3. The hybrid multiple redundant computer system of claim 1 wherein:

a) said first and second central processor modules respectively connected to said first and second input circuit for receiving input data from said input circuits;

b) the system further comprises an input/output processor connected to said third input circuit for receiving input data from said input circuit;

c) said first and second central processor module connected each to other and connected to the input/output processor for allowing each central processor module to transmit the associated input data to the neighbor central processor module and to said input/output processor, thereby allowing each central processor module to perform the two-out-of-three voting among input data produced by said first, second, and third input circuits and to use a result of said two-out-of-three voting as input to a application program for providing said output data by execution of said application program;

d) said first central processor module further connected to said first microcontroller for delivering said output data produced by said first central processor module to said first microcontroller, said first microcontroller has means for transferring said output data on an output of said first microcontroller;

e) said second central processor module further connected to said second microcontroller for delivering output data produced by said second central processor module to said second microcontroller, said second microcontroller has means for transferring said output data on an output of said second microcontroller;

f) said first and second central processor module further connected to said input/output processor for delivering said output data produced by said first and second central processor module to said input/output processor;

g) said input/output processor has means for implementing the selected logic operation with said output data received from said first and second central processor modules and for delivering a result of said selected logic operation to said third microcontroller, said third microcontroller has means for transferring the result of said selected logic operation on an output of said third microcontroller;

h) said input/output processor further has means for storing a set of the selected logic operations and for allowing said application program to select a certain logic operation from said set of selected logic operations;

i) said output module further including a first, a second, and a third output circuit, each of said output circuits is connected to the associated microcontroller and to the neighbor microcontroller for receiving output data produced by said microcontrollers, for performing a logical product of said output data, and for transferring said logical product on an output of said output circuit;

j) said first output circuit is connected to said first and third microcontrollers for receiving the output data produced by said microcontrollers and for performing the logical product of said output data, thereby allowing said first output circuit to generate its output as the logical product of the output produced by said first central processor module and the result of said selected logic operation;

k) said second output circuit is connected to said second and first microcontrollers for receiving the output data produced by said microcontrollers and for performing the logical product of said output data, thereby allowing said second output circuit to generate its output as the logical product of the output data produced by said first and second central processor modules;

l) said third output circuit is connected to said third and second microcontrollers for receiving the output data produced by said microcontrollers and for performing the logical product of said output data, thereby allowing said third output circuit to generate its output as the logical product of the result of said selected logic operation and the output data produced by said second central processor module;

m) the outputs of said first, second, and third output circuit are connected to each other to provide a two-out-of-three voting among output data produced by the first, second, and third microcontrollers, thereby allowing the system to generate a system output as a result of a two-out-of-two voting of output data generated by first and second central processor modules;

n) means in said first and second microcontroller for detecting the occurrence of a fault within the associated central processor module, and for activating the alarm signal in the event that said central processor module fails;

o) means in the third microcontroller for detecting the occurrence of a fault within said input/output processor and for activating an alarm signal in the event that said input/output processor fails;

p) means in the said input/output processor for detecting the occurrence of a fault within said first and second central processor module and for receiving output data only from one of said central processor modules that has not failed, said input/output processor further has means for commanding said third microcontroller to activate the alarm signal in the event that both first and second central processor module fail concurrently;

q) means in the output module for generating the system output as the result of said two-out-of-two voting among data produced by said first and second central processor modules if said alarm signal in each of said microcontrollers is not activated, for generating the system output by only using output data received from one of said central processor modules that has not failed if said alarm signal associated with a faulty central processor module is activated and for disabling said output if each alarm signal is activated, thereby allowing the output module to revert from said two-out-of-two voting to a one-out-of-one voting in the event that the first or the second central processor module fails, and forcing the system output to be in the predetermined safe output condition in case that both first and second central processor modules concurrently fail; and r) means in each central processor module and in the input/output processor for reading status of the associated input circuit and disabling input data of said input circuit if a fault of said input circuit is discovered.

4. The dual/triple redundant computer system of claim 3 wherein:

a) the input/output processor has means for calculating a logical sum of the output data produced by the first and the second central processor modules and for delivering said logical sum to said third microcontroller, said third microcontroller has means for transferring said logical sum on an output of said microcontroller;

b) said input/output processor further has means for comparing each scan of output data received from the first and the second central processor module, for commanding said third microcontroller to freeze the output of said third microcontroller if a disagreement between said output data is discovered and for producing a logical "0" value on said output to perform a shutdown if said disagreement is repeated more times that is defined by a predetermined limitation established in the application program; means in said first and second microcontroller for detecting the occurrence of a fault within the associated central processor module, and for activating the alarm signal in the event that said central processor module fails;

c) means in the third microcontroller for detecting the occurrence of a fault within said input/output processor and for activating an alarm signal in the event that said input/output processor fails;

d) means in the said input/output processor for detecting the occurrence of a fault within said first and second central processor module and for receiving output data only from one of said central processor modules that has not failed, said input/output processor further has means for commanding said third microcontroller to activate the alarm signal in the event that both first and second central processor modules fail concurrently;

e) means in the output module for generating the system output as the result of said two-out-of-two voting among data produced by said first and second central processor modules if said alarm signal in each of said microcontrollers is not activated, for generating the system output by only using output data received from one of said central processor modules that has not failed if said alarm signal associated with a faulty central processor module is activated and for disabling said output if each alarm signal is activated, thereby allowing the output module to revert from said two-out-of-two voting to a one-out-of-one voting in the event that the first or the second central processor module fails, and forcing the system output to be in the predetermined safe output condition in case that both first and second central processor modules concurrently fail;

f) means in each central processor module and in the input/output processor for reading status of the associated input circuit and disabling input data of said input circuit if a fault of said input circuit is discovered;

g) said output module further including a first, a second, and a third watchdog controller each of which connected to the associated microcontroller for detecting the occurrence of a fault within said microcontroller and for activating an alarm signal in the event that the associated microcontroller fails;

h) each said output circuit is connected to the associated watchdog controller and connected to neighbor watchdog controllers for receiving said alarm signal from any of said watchdog controllers;

i) means in each output circuit for generating its output as a logical product of output data received from the associated and the neighbor microcontroller if said alarm signal in each of said watchdog controllers is not activated, for generating said output by only using output data received from the associated microcontroller if at least one out of two alarm signals produced by the neighbor watchdog controllers is activated, and for disabling said output if the alarm signal produced by the associated watchdog controller is activated, thereby allowing the associated output module to revert from two-out-of-three voting among output data produced by said first, second, and third microcontroller to the two-out-of-two voting in the event that that one microcontroller fails, to the one-out-of-one voting in the event that two microcontroller concurrently fail, and to the predetermined safe output condition in the event that each microcontroller fail;

j) said means in the first output circuit for generating its output as a logical product of output data received from the first microcontroller and said logical sum if said alarm signal in each of said watchdog controllers is not activated, generating said output by only using output data received from the first microcontroller if at least one out of two alarm signals produced by second and third watchdog controllers is activated, and for disabling said output if the alarm signal produced by the first watchdog controller is activated;

k) said means in the second output circuit for generating its output as a logical product of output data received from second and first microcontrollers if said alarm signal in each of said watchdog controllers is not activated, generating said output by only using output data received from the second microcontroller if at least one out of two alarm signals produced by first and third watchdog controllers is activated, and for disabling said output if the alarm signal produced by the second watchdog controller is activated; and l) said means in the third output circuit for generating its output as a logical product of said logical sum and output data received from the second microcontroller if said alarm signal in each of said watchdog controllers is not activated, generating said output by only using said logical sum if at least one out of two alarm signals produced by first and second watchdog controllers is activated, and for disabling said output if the alarm signal produced by the third watchdog controller is activated.

5. A dual/triple redundant computer system comprising:

a) a first and a second central processor modules operating in parallel, each central processor module has means for executing the same application program;

b) at least one input/output subsystem for sending input data and receiving output data and to/from each central processor module;

c) said input/output subsystem is composed of;
   at least one input module included a first, a second, and a third input circuits operating in parallel,
   at least one output module including a first, a second, and a third microcontrollers operating in parallel;

d) the input/output subsystem further comprising a first, a second, and a third input/output processor operating in parallel for collecting input data, voting input data, for sending outvoted input data to said first and second central processor modules, and for receiving output data from said first and second central processor modules;

e) a first and a second input/output network;

f) a first and a second communication links;

g) said first, second, and third input/output processor connected respectively to said first, second, and third input circuits for receiving said input data from said input circuits;

h) said first and second input/output processor further connected to each other via said first communication links for allowing each input/output processor to transmit the associated input data to the neighbor input/output processor, for allowing each input/output processor to perform the two-out-of-three voting among input data produced by said first, second, and third input circuits;

i) said first and second central processor modules respectively connected to said first and second input/output processor over said first and second input/output network for receiving a result of said two-out-of-three voting of said input data, for using said result as input to an application program, for providing output data by execution of said application program, and for delivering said output data to the associated input/output processor;

f) said first and second input/output processor respectively connected to said first and second central processor module over said first and second input/output network for receiving said output data from the associated central processor module and for transferring the associated output data to said third input/output processor;

g) means in said third input/output processor for implementing a selected logic operation with the output data produced by said first and second central processor modules;

h) said first input/output processor further connected to said first microcontroller for delivering said output data produced by said first central processor module to said first microcontroller, said first microcontroller has means for transferring said output data on an output of said first microcontroller;

i) said second input/output processor further connected to said second microcontroller for delivering output data produced by said second central processor module to said second microcontroller, said second microcontroller has means for transferring said output data on an output of said second microcontroller;

j) said third input/output processor further connected to said third microcontroller for delivering a result of said selected logic operation to said third microcontroller, said third microcontroller has means for transferring the result of said selected logic operation on an output of said third microcontroller;

k) means in said third input/output processor for storing a set of said selected logic operations and for allowing said application program to select a certain logic operation from said set of selected logic operations;

l) said output module further including a first, a second, and a third output circuit, each of said output circuits is connected to the associated microcontroller and to the neighbor microcontroller for receiving output data produced by said microcontrollers, for performing a logical product of said output data, and for transferring said logical product on an output of said output circuit;

m) said first output circuit is connected to said first and third microcontrollers for receiving the output data produced by said microcontrollers and for performing the logical product of said output data, thereby allowing said first output circuit to generate its output as the logical product of the output data produced by said first central processor module and the result of said selected logical operation;

n) said second output circuit is connected to said second and first microcontroller for receiving output data produced by said microcontrollers and for performing the logical product of said output data, thereby allowing said second output circuit to generate its output as the logical product of the output data produced by said second and first central processor modules;

o) said third output circuit is connected to said third and second microcontrollers for receiving the output data produced by said microcontrollers and for performing the logical product of said output data, thereby allowing said third output circuit to generate its output as the logical product of the result of said selected logical operation and the output data produced by said second central processor module;

p) the outputs of said first, second, and third output circuit are connected to each other for providing a two-out-of-three voting among output data produced by the first, second, and third microcontrollers for allowing the system to generate a system output as a result of two-out-of-three voting among output data produced by said first, second, and third input/output processors, thereby allowing the system to generate a system output as a result of a two-out-of-two voting of output data generated by said first and second central processor modules;

q) means in said first, second, and third microcontroller for detecting the occurrence of a fault within the associated input/output processor and for activating an alarm signal in the event that said input/output processor fails;

r) means in the third input/output processor for detecting the occurrence of a fault within said first and second input/output processor and for receiving output data only from one of said input/output processors that has not failed, said third input/output processor further has means for commanding said third microcontroller to activate said alarm signal in the event that said first and second input/output processor fail concurrently;

s) means in said first and second input/output processor for respectively detecting the occurrence of a fault within said first and second central processor module, for commanding the associated first and second microcontroller to activate the associated alarm signal in the event that said first or second central processor module fails;

t) means in each output module for generating the system output as the result of a two-out-of-two voting among data produced by first and second central processor modules if said alarm signal in each of said microcontrollers is not activated, for generating the system output by only using output data received from one of said central processor modules if said alarm signal associated with a faulty central processor module is activated and for disabling said output if each alarm signal is activated, thereby allowing said output module to revert from said two-out-of-two voting to a one-out-of-one voting in the event that the first or the second central processor module fails, and forcing the system output to be in the predetermined safe output condition in case that both first and second central processor modules concurrently fail;

u) means in each output module for detecting the occurrence of a fault within each microcontroller and for respectively activating an associated alarm signal in the event that first, or the second, or the third, microcontroller fails;

v) means in each output module for generating its output as a logical product of output data received from the associated and the neighbor microcontroller if each of said alarm signals is not activated, for generating said output by only using output data received from the associated microcontroller if at least one out of two alarm signals associated with neighbor microcontrollers is activated, for disabling said output if the associated microcontroller fails and the associated alarm signal is activated, thereby allowing said output module to revert from said two-out-of-three voting among output data produced by the first, second, and third microcontrollers to a two-out-of-two voting in the event that one microcontroller fails, to a one-out-of-one voting the event that that two microcontroller concurrently fail, and to the predetermined safe output condition in the event that each microcontroller fail;

w) means in each microcontroller for reading status of the associated output circuit and disabling the output of said output circuit if a fault of said output circuit is discovered;

x) means in each input/output processor for reading status of the associated input circuit and disabling input data of said input circuit if a fault of said input circuit is discovered;

y) means in each input/output processor for synchronizing its operation with the operation of neighbor input/output processors and for transmitting its status to neighbor input/output processors via said first communication links; and z) means in each central processor modules for synchronizing its operation with the operation of neighbor central processor modules via said second communication links and means for providing scan-based mode of system operation to perform said application program execution on a cyclical basis.

6. The dual/triple redundant computer system of claim 5, wherein:

a) the third input/output processor has means for calculating a logical sum of output data received from said first and second input/output processors, said third input/output processor further connected to the third microcontroller for delivering said logical sum to said third microcontroller, the third microcontroller has means for transferring said logical sum on an output of said microcontroller;

b) said third input/output processor further has means for comparing each scan of output data received from the first and the second input/output processors, for commanding said third microcontroller to freeze the output of said third microcontroller if a disagreement between said output data is discovered and for producing a logical "0" value on said output to perform a shutdown if said disagreement is repeated more times that is defined by a predetermined limitation established in the application program;

c) means in said first, second, and third microcontroller for detecting the occurrence of a fault within the associated input/output processor, and for activating an alarm signal in the event that said input/output processor fails;

d) means in said third input/output processor for detecting the occurrence of a fault within said first and second input/output processor and for receiving output data only from one of said input/output processor that has not failed, said third input/output processor further has means for commanding said third microcontroller to activate the alarm signal in the event that both first and second input/output processors fail concurrently;

e) means in each output module for generating the system output as the result of the two-out-of-three voting among data produced by said first, second, and third input/output processors if said alarm signal in each of said microcontrollers is not activated, for reverting from said two-out-of-three voting to the two-out-of-two voting in the event that one of said input/output processor fails, to a one-out-of-one voting in the event that two input/output processors concurrently fail, and forcing the system output to be in the predetermined safe output condition in case that first, second, and third input/output processors concurrently fail, f) means in each output module for generating the system output as the result of the two-out-of-two voting among data produced by said first and second central processor module if said alarm signal in each of said microcontrollers is not activated, for reverting from said two-out-of-two voting to a one-out-of-one voting in the event that said first or second central processor module fails, and forcing the system output to be in the predetermined safe output condition in case that both first and second central processor modules concurrently fail;

g) means in each input/output processor for reading status of the associated input circuit and disabling input data of said input circuit if a fault of said input circuit is discovered;

h) said output module further including a first, a second, and a third watchdog controller each of which connected to the associated microcontroller for detecting the occurrence of a fault within said microcontroller and for activating an alarm signal in the event that the associated microcontroller fails;

i) each said output circuit is connected to the associated watchdog controller and connected to neighbor watchdog controllers for receiving said alarm signal from any of said watchdog controllers;

j) means in each output circuit for generating its output as a logical product of output data received from the associated and the neighbor microcontroller if said alarm signal in each of said watchdog controllers is not activated, for generating said output by only using output data received from the associated microcontroller if at least one out of two alarm signals produced by the neighbor watchdog controllers is activated, and for disabling said output if the alarm signal produced by the associated watchdog controller is activated, thereby allowing the associated output module to revert from two-out-of-three voting among output data produced by said first, second, and third microcontroller to the two-out-of-two voting in the event that that one microcontroller fails, to the one-out-of-one voting in the event that two microcontroller concurrently fail, and to the predetermined safe output condition in the event that each microcontroller fail;

k) said means in the first output circuit for generating its output as a logical product of output data received from the first microcontroller and said logical sum if said alarm signal in each of said watchdog controllers is not activated, generating said output by only using output data received from the first microcontroller if at least one out of two alarm signals produced by second and third watchdog controllers is activated, and for disabling said output if the alarm signal produced by the first watchdog controller is activated;

l) said means in the second output circuit for generating its output as a logical product of output data received from second and first microcontrollers if said alarm signal in each of said watchdog controllers is not activated, generating said output by only using output data received from the second microcontroller if at least one out of two alarm signals produced by first and third watchdog controllers is activated, and for disabling said output if the alarm signal produced by the second watchdog controller is activated; and m) said means in the third output circuit for generating its output as a logical product of said logical sum and output data received from the second microcontroller if said alarm signal in each of said watchdog controllers is not activated, generating said output by only using said logical sum if at least one out of two alarm signals produced by first and second watchdog controllers is activated, and for disabling said output if the alarm signal produced by the third watchdog controller is activated.

7. The dual/triple redundant computer system of claim 6, wherein:
   a) the first central processor module is further connected to the third input/output processor for reading input data and sending output data from/to said third input/output processor in the event that the first input/output processor fails;
   b) the second central processor module further connected to the third input/output processor for reading input data and sending output data from/to said third input/output processor in the event that the second input/output processor fails;
   c) said third input/output processor has means for transferring output data received from said first central processor module to said second input/output processor in the event that the first input/output processor fails and means for transferring output data received from said second central processor module to said first input/output processor in the event that the second input/output processor fails;
   d) said third input/output processor has means for calculating the logical sum of output data received from said first and second central processor modules in the event that said first and second input/output processors concurrently fail and for delivering said logical sum to the third microcontroller, said third microcontroller has means for transferring said logical sum on an output of said microcontroller; and
   e) said first and second central processor module further has means for monitoring on each scan a status of first and second input/output processor respectively and for synchronously reading input data and sending output data from/to said third input/output processor in the event that the associated input/output processor fails, thereby allowing the system to implement the two-out-of-two voting among output data produced by said first and second central processor modules although said first or said second input/output processor fails or in the event that both said input/output processors concurrently fail.

8. The dual/triple redundant computer system of claim 5, wherein:
   a) said first and second central processor modules operate in hot standby sparing mode providing the first central processor module to be in the online state, while the second central processor modules is in the off-line state and vice versa;
   b) said first and second central processor modules operate in hot standby sparing mode providing each central processor module to be in the online state, while the neighbor central processor modules is in the off-line state;
   c) each central processor module being in on-line state runs the application program and communicates with the associated input/output processor for reading said input data and sending said output data from/to said input/output processor over the associated input/output network;
   d) said first central processor module being in on-line state runs the application program and communicates with the first input/output processor for reading the associated input data and sending the associated output data from/to said first input/output processor over said first input/output network;
   e) said second central processor module being in on-line state runs the application program and communicate with the second input/output processor for reading the associated input data and sending the associated output data from/to said second input/output processor over said second input/output network;
   f) said first, second, and third input/output processor connected respectively to said first, second, and third input circuits for receiving said input data from said input circuits;
   g) said first and second input/output processor further connected each to other via said first communication links for allowing each input/output processor to transmit the associated input data to the neighbor input/output processor, for allowing each input/output processor to perform the two-out-of-three voting among input data produced by said first, second, and third input circuits;
   h) means in said first and second input/output processor for transmitting a result of said two-out-of-three voting to the associated central processor module over the associated input/output network if the associated central processor module is in on-line state, thereby allowing said central processor module to utilize the result of said two-out-of-three voting as input to a application program to provide said output data by execution of said application program;
   i) each central processor module being in on-line state runs the application program and communicates with the associated input/output processor for reading said input data and sending said output data from/to said input/output processor over the associated input/output network;
   j) said first central processor module being in on-line state runs the application program and communicates with the first input/output processor for reading the associated input data and sending the associated output data from/to said first input/output processor over said first input/output network;
   k) said second central processor module being in on-line state runs the application program and communicate with the second input/output processor for reading the associated input data and sending the associated output data from/to said second input/output processor over said second input/output network;
   l) means in said first input/output processor for sending the output data received from said first central processor module to said second and third input/output processor at the same time over said first communication links for providing the same output data on outputs of said first, second, and third input/output processors, thereby allowing the associated output module to implement the two-out-of-three voting among output data produced by said input/output processors;
   m) means in said second input/output processor for sending the output data received from said second central processor module to said first and third input/output processors at the same time over said first communication links for providing the same output data on outputs of said first, second, and third input/output processors, thereby allowing the associated output module to implement said two-out-of-three voting among output data produced by said input/output processors;
   n) said first and second central processor module further includes a first fault detector circuit and a second fault detector circuit respectively, said fault detector circuits are connected to each other over said second communication links;

o) said first central processor module being in the on-line state has means for updating said second central processor module each scan via said first fault detector circuit;

p) said second central processor module being in the on-line state has means for updating said first central processor module each scan via said second fault detector circuit;

q) said first fault detector circuit has means for monitoring a condition of said first central processor module when said first central processor module is in on-line state, for driving said first central processor module to off-line state and switching said second central processor module to on-line state in the event that said first central processor module fails, thereby allowing the system remain operational in the presence of fault in said first central processor module;

r) said second fault detector circuit has means for monitoring a condition of said second central processor module when said first central processor module is in on-line state, for driving said second central processor module to off-line state and switching said first central processor module to on-line state in the event that said second central processor module fails, thereby allowing the system remain operational in the presence of fault in said second central processor module;

s) said first central processor module further has means for reading a status of said first input/output processor and for commanding said first fault detector circuit to drive said first central processor module to the off-line state and switching said second central processor module to the on-line state in the event that said first input/output processor fails;

t) said second central processor module further has means for reading a status of said second input/output processor and for commanding said second fault detector circuit to drive said second central processor module to the off-line state and switching said first central processor module to the on-line state in the event that said second input/output processor fails;

u) means in each input/output processor for transferring output data produced by each central processor module that is in on-line state to the associated microcontroller, said microcontroller has means for transferring said output data on an output of said microcontroller;

v) means in said first, second, and third microcontroller for detecting the occurrence of a fault within the associated input/output processor, and for activating an alarm signal in the event that said input/output processor fails;

w) means in said third input/output processor for detecting the occurrence of a fault within said first and second input/output processor and for receiving output data only from one of said input/output processor that has not failed, said third input/output processor further has means for commanding said third microcontroller to activate the alarm signal in the event that both first and second input/output processors fail concurrently;

x) means in each output module for generating the system output as the result of the two-out-of-three voting among data produced by said first, second, and third input/output processors if said alarm signal in each of said microcontrollers is not activated, for reverting from said two-out-of-three voting to the two-out-of-two voting in the event that one of said input/output processor fails, to a one-out-of-one voting in the event that two input/output processors concurrently fail, and forcing the system output to be in the predetermined safe output condition in case that first, second, and third input/output processors concurrently fail; and y) means in each output module for generating its output as a logical product of output data received from the associated and the neighbor microcontroller if said alarm signal in each of said watchdog controllers is not activated, for generating said output by only using output data received from the associated microcontroller if at least one out of two alarm signals produced by the neighbor watchdog controllers is activated, and for disabling said output if the alarm signal produced by the associated watchdog controller is activated, thereby allowing said output module to revert from two-out-of-three voting among output data produced by said first, second, and third microcontroller to the two-out-of-two voting in the event that that one microcontroller fails, to the one-out-of-one voting in the event that two microcontroller concurrently fail, and to the predetermined safe output condition in the event that each microcontroller fail.

9. The dual/triple redundant computer system of claim 8, wherein:

a) the first central processor module further connected to the third input/output processor, said first central processor module being in on-line state has means for reading input data and sending output data from/to said third input/output processor in the event that the first input/output processor fails;

b) the second central processor module further connected to the third input/output processor, said second central processor module being in on-line state has means for reading input data and sending output data from/to said third input/output processor in the event that the second input/output processor fails;

c) said third input/output processor has means for transferring output data received from said first central processor module to said second input/output processor in the event that the first input/output processor fails and means for transferring output data received from said second central processor module to said first input/output processor in the event that the second input/output processor fails;

d) said first or said second central processor module being in the on-line state further has means for monitoring each scan a status of first and second input/output processor respectively and for reading input data and sending output data from/to said third input/output processor in the event that the associated input/output processor fails, thereby allowing the system remain operational in the event that said first or/and second input/output processors fail;

e) said first central processor module being in the on-line state further has means for periodically monitoring a status of said third input/output processor and for switching said on-line state to said second central processor module in the event that said first and third input/output processors concurrently fail, thereby allowing the system remain operational in the presence of faults in said first and third input/output processors; and f) said second central processor module being in the on-line state further has means for periodically monitoring a status of said third input/output processor and for switching said on-line state to said first central processor module in the event that said second and third input/output processors concurrently fail, thereby allowing the system remain operational in the presence of faults in said second and third input/output processors.

10. The dual/triple redundant computer system of claim 9 wherein:
   a) each central processor module further includes a first I/O interface and a second I/O interface for allowing each central processor module to communicate with each input/output subsystem either over said first input/output network or over said second input/output network, thereby allowing the system to remain operational in the event that one of said input/output networks fails;
   b) the first interface in the first central processor module connected with the first interface in the second central processor module and connected to said first input/output processor over said first input/output network for allowing each central processor module being on-line to communicate with said first input/output processor; and
   c) the second interface in the second central processor module connected with the second interface in the first central processor module and connected to said second input/output processor over said second input/output network for allowing each central processor module being on-line to communicate with said second input/output processor.

11. The dual/triple redundant computer system of claim 2, wherein:
   a) each of said central processor modules further has means for periodically producing a single-bit output data per point as a result of the implementation of said application program and for transferring said single-bit data to both of the associated microcontrollers;
   b) each output circuit including a logic circuit connected to the associated microcontroller and to the neighbor microcontroller for receiving said single-bit output data from said microcontrollers and for transferring said single-bit output data respectively to a first and a second output of said logic circuit;
   c) each output circuit further comprising a voting network connected to outputs of said logic circuit for producing a logic product of said outputs on the output of said voting network, thereby producing a single-bit output of the voting network per point as a logical product of said single-bit output data received by said logic circuit from associated and neighbor microcontrollers;
   d) said single-bit outputs of said neighbor voting networks are connected together for generating system output per point as a logical sum of said logical products to perform the two-out-of-three voting among output data produced by the first, second, and third microcontrollers, thereby providing the system output per point as a result of a two-out-of-two voting of said single-bit output data generated by said first and second central processor modules;
   e) means in each microcontroller for disabling outputs of the associated voting network in the event that said voting network or the associated logic circuit fails;
   f) each logic circuit is further connected to the associated watchdog controller and connected to neighbor watchdog controllers for receiving said alarm signal from any of said watchdog controllers;
   g) each logic circuit has means for transferring said single-bit output data to the associated voting network if said alarm signal in each watchdog controller is not activated, for disabling all single-bit outputs of the associated voting network if alarm signal of the associated watchdog controller is activated, and for generating the single-bit output of the associated voting network by using the single-bit data received from only one associated microcontroller if at least one out of two alarm signals in the neighbor watchdog controllers is activated;
   h) the first logic circuit has means for transferring said single-bit data received from the first and third microcontroller to the associated voting network if said alarm signal in each watchdog controller is not activated, means for disabling the outputs of the associated output voting network if alarm signal in the first watchdog controller is activated, and means for generating the single-bit output of the said voting network by using the single-bit data received from the first microcontroller if at least one out of two alarm signals in the neighbor watchdog controllers is activated;
   i) the second logic circuit has means for transferring said single-bit data received from the second and first microcontroller to the associated voting network if said alarm signal in each watchdog controller is not activated, means for disabling the outputs of the associated output voting network if alarm signal received from the second watchdog controller is activated, and means for generating the single-bit output of the said voting network by using the single-bit data received from the second microcontroller if at least one out of two alarm signals received from the neighbor watchdog controllers is activated; and
   j) the third logic circuit has means for transferring said single-bit data received from the third and second microcontroller to the associated voting network if said alarm signal in each watchdog controller is not activated, means for disabling the outputs of the associated output voting network if alarm signal received from the third watchdog controller is activated, and means for generating the single-bit output of the said voting network by using the single-bit data received from the third microcontroller if at least one out of two alarm signals received by the neighbor watchdog controllers is activated.

* * * * *